US011333081B2

(12) United States Patent
Ferns et al.

(10) Patent No.: US 11,333,081 B2
(45) Date of Patent: May 17, 2022

(54) ROTATING MACHINE CONTROL DEVICE, ROTATING MACHINE EQUIPMENT, ROTATING MACHINE CONTROL METHOD, AND ROTATING MACHINE CONTROL PROGRAM

(71) Applicant: Mitsubishi Hitachi Power Systems, Ltd., Kanagawa (JP)

(72) Inventors: David Ferns, Yokohama (JP); Keita Fujii, Yokohama (JP); Osamu Ueda, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 230 days.

(21) Appl. No.: 16/634,415

(22) PCT Filed: Sep. 20, 2018

(86) PCT No.: PCT/JP2018/034804
§ 371 (c)(1),
(2) Date: Jan. 27, 2020

(87) PCT Pub. No.: WO2019/059273
PCT Pub. Date: Mar. 28, 2019

(65) Prior Publication Data
US 2020/0173373 A1 Jun. 4, 2020

(30) Foreign Application Priority Data

Sep. 22, 2017 (JP) .............................. JP2017-182800

(51) Int. Cl.
*F02C 9/28* (2006.01)
*F01K 23/10* (2006.01)
(Continued)

(52) U.S. Cl.
CPC ................ *F02C 9/28* (2013.01); *F01K 23/10* (2013.01); *F01D 25/12* (2013.01); *F02C 6/18* (2013.01);
(Continued)

(58) Field of Classification Search
CPC .... F02C 9/28; F02C 9/26; F01D 11/14; F01D 11/24; F04D 29/642
See application file for complete search history.

(56) References Cited

U.S. PATENT DOCUMENTS 8,126,628 B2 * 2/2012 Hershey .................. F01D 11/24
701/100
8,296,037 B2 * 10/2012 Plunkett .................. F01D 11/24
701/100
(Continued)

FOREIGN PATENT DOCUMENTS

JP        11-50809        2/1999
JP      2000-027606       1/2000
(Continued)

OTHER PUBLICATIONS

International Search Report dated Dec. 4, 2018 in International (PCT) Application No. PCT/JP2018/034804.
(Continued)

*Primary Examiner* — Todd E Manahan
*Assistant Examiner* — Thuyhang N Nguyen
(74) *Attorney, Agent, or Firm* — Wenderoth, Lind & Ponack, L.L.P.

(57) ABSTRACT

A rotating machine control device is provided with: an operating terminal for changing a parameter of the rotating machine; a clearance measuring device which measures the amount of clearance between a rotor and a casing; and a control device body. The control device body, in accordance with the amount of clearance measured by means of the
(Continued)

clearance measuring device, determines an operating amount for the operating terminal so as to vary the rate of change in the parameter, and outputs the operating amount to the operating terminal.

17 Claims, 17 Drawing Sheets

(51) Int. Cl.
  *F01D 25/12* (2006.01)
  *F02C 6/18* (2006.01)
  *F02C 7/18* (2006.01)

(52) U.S. Cl.
  CPC ............ *F02C 7/18* (2013.01); *F05D 2220/72* (2013.01); *F05D 2220/76* (2013.01); *F05D 2240/35* (2013.01); *F05D 2270/05* (2013.01); *F05D 2270/301* (2013.01); *F05D 2270/303* (2013.01); *F23N 2241/20* (2020.01)

(56) References Cited

U.S. PATENT DOCUMENTS

| | | | | |
|---|---|---|---|---|
| 10,323,536 B2 * | 6/2019 | Hill | ................ | F04D 29/324 |
| 2009/0044542 A1 | 2/2009 | Thatcher et al. | | |
| 2010/0188100 A1 * | 7/2010 | Andarawis | ............. | F01D 11/14 |
| | | | | 324/601 |
| 2014/0156165 A1 * | 6/2014 | Ewens | ...................... | F02C 9/20 |
| | | | | 701/100 |
| 2015/0275703 A1 * | 10/2015 | Thompson | ................ | F02C 6/00 |
| | | | | 60/773 |
| 2016/0251962 A1 | 9/2016 | Hashimoto | | |
| 2018/0209352 A1 | 7/2018 | Endo et al. | | |

FOREIGN PATENT DOCUMENTS

| | | |
|---|---|---|
| JP | 2009-47167 | 3/2009 |
| JP | 2015-078622 | 4/2015 |
| JP | 2015-190469 | 11/2015 |
| JP | 2016-37882 | 3/2016 |
| JP | 2017-078362 | 4/2017 |

OTHER PUBLICATIONS

Written Opinion of the International Searching Authority dated Dec. 4, 2018 in International (PCT) Application No. PCT/JP2018/034804.

* cited by examiner

… between the clearance amount and a first change value for changing the basic change rate so as to obtain the first change value corresponding to the clearance amount. In this case, the change rate change unit may use the first change value so as to change the basic change rate.

In the control device of the rotating machine having the first calculation unit, the change value calculation unit may have a second calculation unit that obtains a second change value for changing the basic change rate in accordance with a deviation between the clearance amount and a predetermined allowable minimum clearance amount. In this case, the change rate change unit may use the first change value and the second change value so as to change the basic change rate.

In the control device of a rotating machine according to any one of the rotating machines having the first change calculation unit, the relationship may be a relationship in which the first change value increases as the clearance amount increases.

According to another aspect of the invention, in order to achieve the above-described object, there is provided rotating machine equipment including any one of the above-described control devices and the rotating machine.

Here, in the rotating machine equipment, the rotating machine may be a gas turbine including a compressor that generates compressed air by compressing air, a combustor that generates combustion gas by combusting a fuel in the compressed air, and a turbine driven by using the combustion gas. The compressor may have a rotating compressor rotor, and a compressor casing that covers the compressor rotor. The turbine may have a rotating turbine rotor, and a turbine casing that covers the turbine rotor. The compressor rotor and the turbine rotor may be mechanically connected to each other so as to form a gas turbine rotor. The operation terminal may be a fuel control valve that controls a flow rate of the fuel to be supplied to the combustor. The clearance measuring instrument may measure a gas turbine clearance amount between the turbine rotor and the turbine casing. In this case, the parameter change rate setting unit may determine the change rate of the parameter so that the change rate of the parameter is changed in accordance with the gas turbine clearance amount at least when the parameter increases, out of when the parameter increases and when the parameter decreases.

The gas turbine clearance amount temporarily decreases when the parameter increases, and the gas turbine clearance amount temporarily increases when the parameter decreases. According to this aspect, the change rate is determined so that the change rate of the parameter is changed in accordance with the gas turbine clearance amount when the parameter increases. Then, according to this aspect, the operation amount of the fuel control valve is obtained in accordance with the change rate, and the operation amount is output to the fuel control valve. Therefore, according to this aspect, even when the parameter of the gas turbine increases, the parameter can reach the target value in a short time while the gas turbine clearance amount is prevented from being extremely smaller.

In the rotating machine equipment in which the rotating machine is the gas turbine, the compressor may be disposed in the compressor casing, and may have an inlet guide vane that controls the flow rate of the air flowing into the compressor casing. In this case, the control device may have an intake air operation amount setting unit that determines an operation amount of the inlet guide vane in accordance with the gas turbine clearance amount, and an intake air operation amount output unit that outputs the operation amount of the inlet guide vane to the inlet guide vane.

If an intake air flow rate which is the flow rate of the air flowing into the compressor casing increases without changing a fuel flow rate, the temperature of the combustion gas flowing in the combustion gas flow path is lowered, and the gas turbine clearance amount is changed. According to this aspect, the intake air flow rate is changed in accordance with the gas turbine clearance amount. Therefore, the gas turbine clearance amount can be prevented from being extremely smaller.

In any one of the above-described rotating machine equipment in which the rotating machine is the gas turbine, the gas turbine may include an air bleeding line that bleeds the air compressed by the compressor so that the bled air is guided to a rotor blade of the turbine rotor, a cooler that cools the air flowing in the air bleeding line, and a cooling controller that controls a cooling amount of the air cooled by the cooler. In this case, the control device may have a cooling operation amount setting unit that determines an operation amount of the cooling controller in accordance with the gas turbine clearance amount, and a cooling operation amount output unit that outputs the operation amount of the cooling controller to the cooling controller.

If the cooling amount of the air cooled by the cooler is changed, the cooling amount of the rotor blade cooled by the air is changed, and the gas turbine clearance amount is changed. According to this aspect, the cooling amount of the air is changed in accordance with the gas turbine clearance amount. Therefore, the gas turbine clearance amount can be prevented from being extremely smaller.

Here, in the rotating machine equipment according to the aspect, the rotating machine may be a steam turbine driven by using steam. The steam turbine may have a rotating steam turbine rotor, and a steam turbine casing that covers the steam turbine rotor. The operation terminal may be a steam control valve that controls a flow rate of the steam to be supplied to the steam turbine. The clearance measuring instrument may measure a steam turbine clearance amount between the steam turbine rotor and the steam turbine casing. In this case, the parameter change rate setting unit may determine the change rate of the parameter in accordance with the steam turbine clearance amount so that the change rate of the parameter is changed at least when the parameter increases, out of when the parameter increases and when the parameter decreases.

The steam turbine clearance amount temporarily decreases when the parameter decreases, and the steam turbine clearance amount temporarily increases when the parameter increases. According to this aspect, the change rate is determined so that the change rate of the parameter is changed in accordance with the steam turbine clearance amount when the parameter decreases. Then, according to this aspect, the operation amount of the steam control valve is obtained in accordance with the change rate, and the operation amount is output to the steam control valve. Therefore, according to this aspect, even when the parameter of the steam turbine decreases, the parameter can reach the target value in a short time while the steam turbine clearance amount is prevented from being extremely smaller.

In addition, in the rotating machine equipment according to the aspect, a first rotating machine and a second rotating machine may be provided as the rotating machine. The first rotating machine may be a gas turbine. The second rotating machine may be a steam turbine. The rotating machine equipment may include a heat recovery system generator that generates steam by using exhaust gas exhausted from the gas turbine, and that feeds the steam to the steam turbine. The gas turbine may have a compressor that generates compressed air by compressing air, a combustor that generates combustion gas by combusting a fuel in the compressed air, and a turbine driven by using the combustion gas. The compressor may have a rotating compressor rotor, and a compressor casing that covers the compressor rotor. The turbine may have a rotating turbine rotor, and a turbine casing that covers the turbine rotor. The compressor rotor and the turbine rotor may be mechanically connected to each other so as to form a gas turbine rotor. The operation terminal of the gas turbine may be a fuel control valve that controls a flow rate of the fuel to be supplied to the combustor. The clearance measuring instrument of the gas turbine may be a gas turbine clearance measuring instrument that measures a gas turbine clearance amount between the turbine rotor and the turbine casing. The steam turbine may have a rotating steam turbine rotor, and a steam turbine casing that covers the steam turbine rotor. The operation terminal of the steam turbine may be a steam control valve that controls a flow rate of the steam to be supplied to the steam turbine from the heat recovery system generator. The clearance measuring instrument of the steam turbine may be a steam turbine clearance measuring instrument that measures a steam turbine clearance amount between the steam turbine rotor and the steam turbine casing. In this case, the parameter change rate setting unit of the gas turbine may determine the change rate of a gas turbine parameter which is the parameter relating to the gas turbine so that the change rate of the gas turbine parameter is changed in accordance with the gas turbine clearance amount when the gas turbine parameter increases, and may determine the change rate of the gas turbine parameter so that the change rate of the gas turbine parameter is changed in accordance with the steam turbine clearance amount when the gas turbine parameter decreases. The operation amount output unit of the gas turbine may determine an operation amount of the fuel control valve in accordance with the change rate of the gas turbine parameter which is determined by the parameter change rate setting unit of the gas turbine, and may output the operation amount of the fuel control valve to the fuel control valve. The parameter change rate setting unit of the steam turbine may determine the change rate of a steam turbine parameter which is the parameter relating to the steam turbine so that the change rate of the steam turbine parameter is changed in accordance with the gas turbine clearance amount when the steam turbine parameter increases, and may determine the change rate of the steam turbine parameter so that the change rate of the steam turbine parameter is changed in accordance with the steam turbine clearance amount when the steam turbine parameter decreases. The operation amount output unit of the steam turbine may determine an operation amount of the steam control valve in accordance with the change rate of the steam turbine parameter which is determined by the parameter change rate setting unit of the steam turbine, and may output the operation amount of the steam control valve to the steam control valve.

The rotating machine equipment according to the embodiment is a so-called combined cycle plant. In the combined cycle plant, if the parameter of the gas turbine increases, the parameter of the steam turbine increases in response thereto. In addition, in the gas turbine, in a case where the parameter increases, the gas turbine clearance amount temporarily decreases. In a case where the parameter decreases, the gas turbine clearance amount temporarily increases. In addition, in the steam turbine, in a case where the parameter increases, the steam turbine clearance amount temporarily increases. In a case where the parameter decreases, the steam turbine clearance amount temporarily decreases.

Therefore, according to this aspect, in a case where the parameter of the gas turbine and the parameter of the steam turbine increase, the operation amount of the operation terminal of the gas turbine and the steam turbine is determined, based on the gas turbine clearance amount which temporarily decreases. In addition, according to this aspect, in a case where the parameter of the gas turbine and the parameter of the steam turbine decrease, the operation amount of the operation terminal of the gas turbine and the steam turbine is determined, based on the steam turbine clearance amount which temporarily decreases. Therefore, according to this aspect, even when the parameter of the gas turbine and the parameter of the steam turbine increase or decrease, the parameter can reach the target value in a short time while each clearance amount of the gas turbine and the steam turbine is prevented from being extremely smaller.

According to another aspect of the invention, in order to achieve the above-described object, there is provided a control method of a rotating machine including a rotating rotor and a casing for covering an outer peripheral side of the rotor. The control method includes a step of receiving a clearance amount between the rotor and the casing, a step of determining a change rate of a parameter which is a rotation speed or an output of the rotating machine so that the change rate of the parameter is changed in accordance with the clearance amount, and a step of determining an operation amount of an operation terminal for changing the parameter in accordance with the change rate of the parameter, and outputting the operation amount to the operation terminal.

Here, in the control method of the rotating machine, in the step of determining the change rate of the parameter, the change rate of the parameter may be determined so that the change rate of the parameter in a case of obtaining a second clearance amount larger than a first clearance amount is higher than the change rate of the parameter in a case of obtaining the first clearance amount.

In addition, in the control method of any one of the rotating machines described above, the step of determining the change rate of the parameter may include a step of obtaining a basic change rate of the parameter in accordance with a deviation between a target value of the parameter and a detection value of the parameter, a step of obtaining a change value for changing the basic change rate in accordance with the clearance amount, and a step of changing the basic change rate by using the change value.

In the control method of the rotating machine in which the step of obtaining the change value is performed, the step of obtaining the change value may include a step of using a relationship between the clearance amount and a first change value for changing the basic change rate so as to obtain the first change value corresponding to the clearance amount. In this case, in the step of changing the basic change rate, the first change value may be used to change the basic change rate.

In the control method of the rotating machine in which the step of obtaining the first change value is performed, the step of obtaining the change value may include a step of obtaining a second change value for changing the basic change rate in accordance with a deviation between the clearance amount and a predetermined allowable minimum clearance amount. In this case, in the step of changing the basic change rate, the first change value may be used to change the basic change rate.

In the control method of any one of the rotating machines described above in which the step of obtaining the first change value is performed, the relationship may be a relationship in which the first change value increases as the clearance amount increases.

According to another aspect of the invention, in order to achieve the above-described object, there is provided a control program of a rotating machine including a rotating rotor and a casing for covering an outer peripheral side of the rotor. The control program causes a computer to execute a step of causing an input device of the computer to receive a clearance amount between the rotor and the casing, a step of determining a change rate of a parameter which is a rotation speed or an output of the rotating machine so that the change rate of the parameter is changed in accordance with the clearance amount, and a step of determining an operation amount of an operation terminal for changing the parameter in accordance with the change rate of the parameter, and outputting the operation amount to the operation terminal.

Here, in the control program of the rotating machine, in the step of determining the change rate of the parameter, the change rate of the parameter may be determined so that the change rate of the parameter in a case of obtaining a second clearance amount larger than a first clearance amount is higher than the change rate of the parameter in a case of obtaining the first clearance amount.

In addition, in the control program of any one of the rotating machines described above, the step of determining the change rate of the parameter may include a step of obtaining a basic change rate of the parameter in accordance with a deviation between a target value of the parameter and a detection value of the parameter, a step of obtaining a change value for changing the basic change rate in accordance with the clearance amount, and a step of obtaining a change amount for changing the basic change rate by using the change value.

In the control program of the rotating machine in which the step of obtaining the change value is performed, the step of obtaining the change value may include a step of using a relationship between the clearance amount and a first change value for changing the basic change rate so as to obtain the first change value corresponding to the clearance amount. In this case, in the step of changing the basic change rate, the first change value may be used to change the basic change rate.

In the control program of the rotating machine in which the step of obtaining the first change value is performed, the step of obtaining the change value may include a step of obtaining a second change value for changing the basic change rate in accordance with a deviation between the clearance amount and a predetermined allowable minimum clearance amount. In this case, in the step of changing the basic change rate, the first change value and the second change value may be used to change the basic change rate.

In the control program of any one of the rotating machines described above in which the step of obtaining the first change value is performed, the relationship may be a relationship in which the first change value increases as the clearance amount increases.

Advantageous Effects of Invention

According to an aspect of the present invention, a rotation speed or an output of a rotating machine can reach a target value in a short time while damage to the rotating machine is prevented.

DESCRIPTION OF EMBODIMENTS

Hereinafter, various embodiments according to the present invention will be described in detail with reference to the drawings.

First Embodiment

Hereinafter, a first embodiment of rotating machine equipment according to the present invention will be described with reference to FIGS. 1 to 11.

Figure 1:
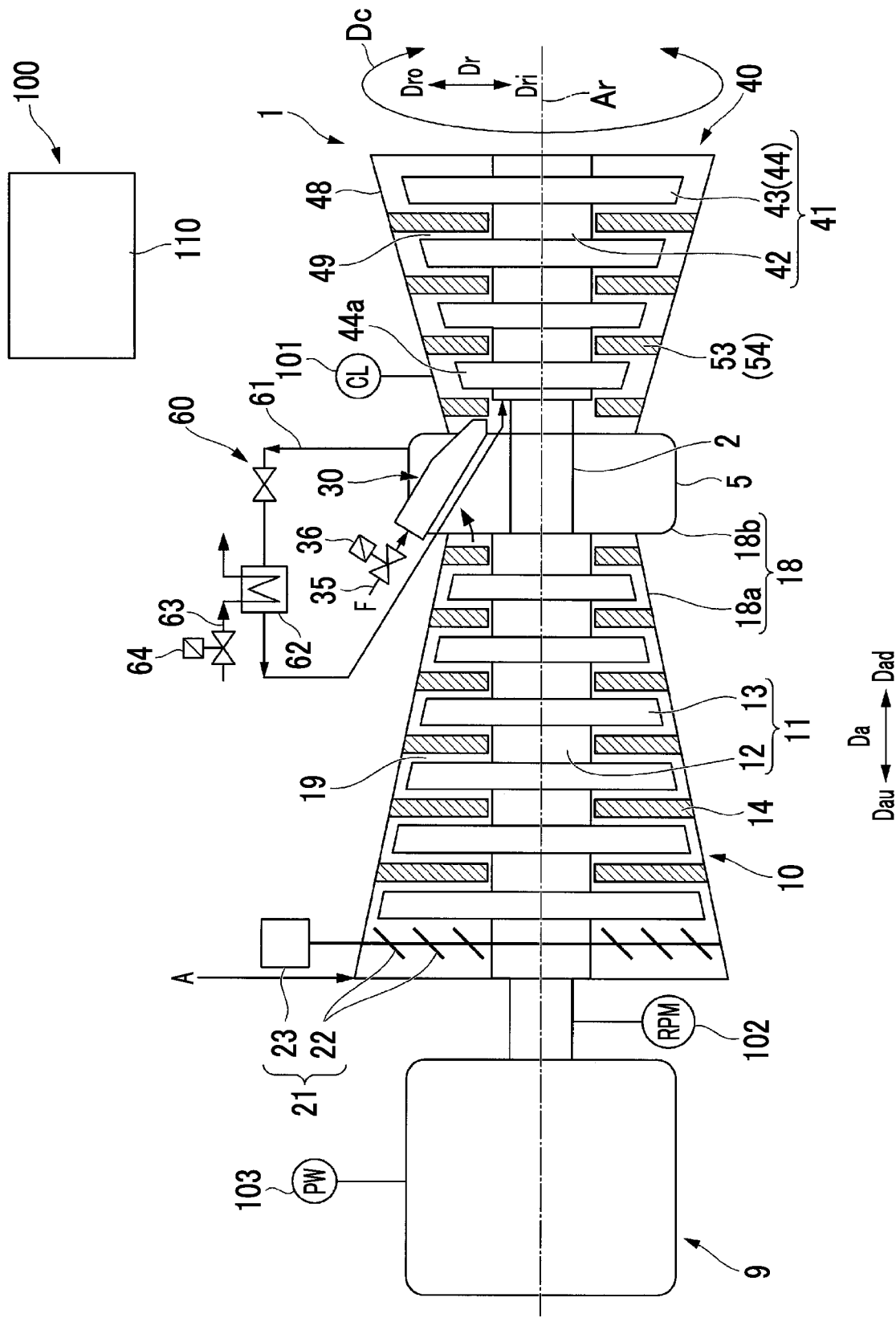
FIG. 1 is a conceptual diagram illustrating a configuration of a gas turbine power generation plant according to a first embodiment of the present invention.

The rotating machine equipment according to the present embodiment is a gas turbine power generation plant as illustrated in FIG. 1. The gas turbine power generation plant includes a gas turbine 1, a generator 9 that generates power by driving the gas turbine 1, a cooling device 60 that cools some of configuration components of the gas turbine 1, and a control device 100.

The gas turbine 1 includes a compressor 10 that compresses air, a combustor 30 that generates combustion gas by combusting a fuel in the air compressed by the compressor 10, and a turbine 40 driven by using the combustion gas.

Figure 2:
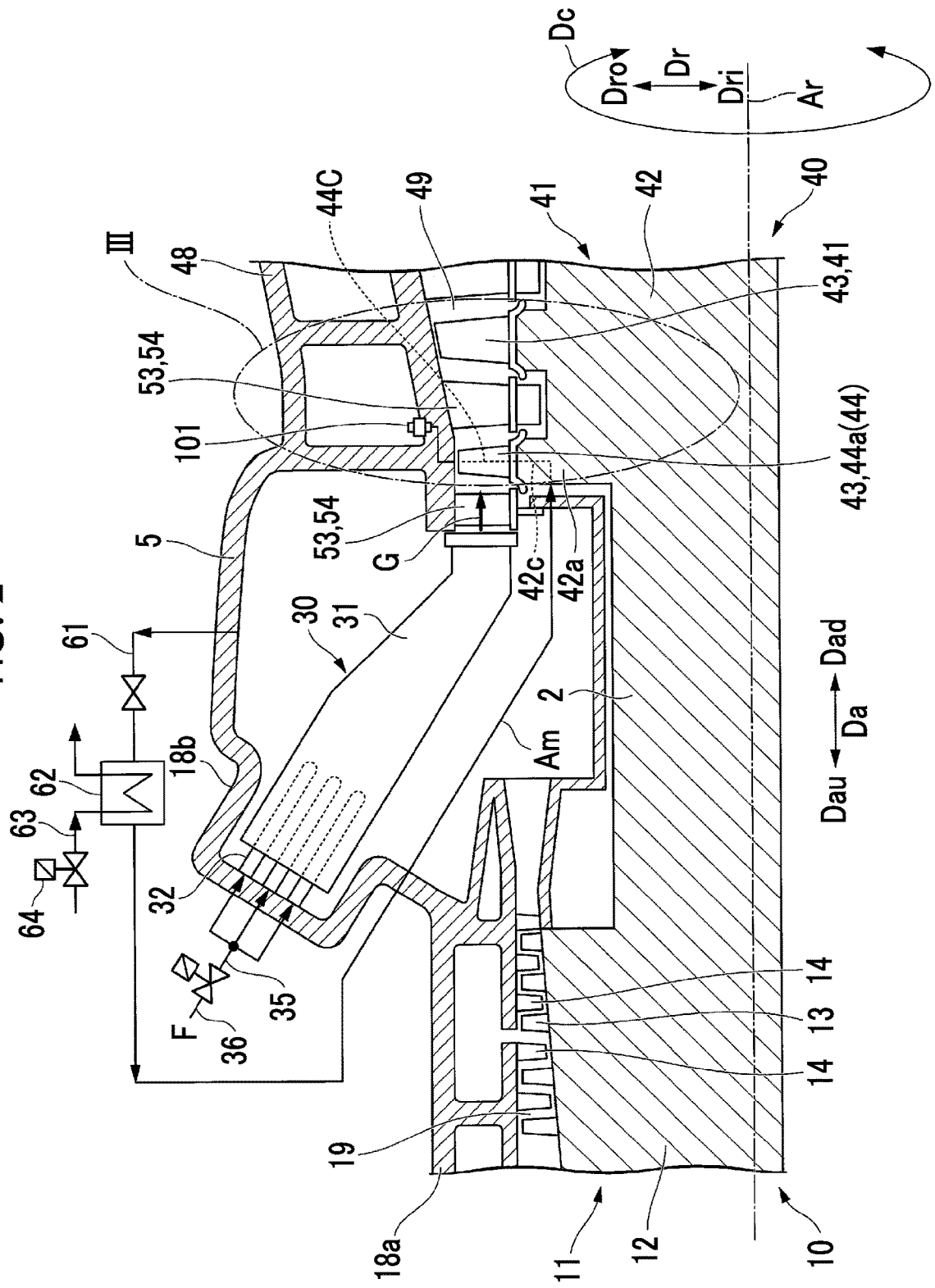
FIG. 2 is a sectional view illustrating a main part of a gas turbine according to the first embodiment of the present invention.

As illustrated in FIGS. 1 and 2, the compressor 10 includes a compressor rotor 11 that rotates around an axis Ar, a compressor casing 18 that covers the compressor rotor 11, a plurality of stator blade rows 14, an inlet guide vane (IGV) 21 that controls a flow rate of air flowing into the compressor casing 18.

In the following description, a direction in which the axis Ar extends will be referred to as an axial direction Da, one side in the axial direction Da will be referred to as an axial upstream side Dau, and the other side will be referred to as an axial downstream side Dad.
The axial upstream side Dau is an upstream-side of an air flow inside the compressor 10, and is an upstream-side of a combustion gas flow inside the turbine 40. The axial downstream side Dad is a downstream-side of the air flow inside the compressor 10, and is a downstream-side of the combustion gas flow inside the turbine 40. In addition, a circumferential direction around the axis Ar will be simply referred to as a circumferential direction Dc, and a direction perpendicular to the axis Ar will be referred to as a radial direction Dr. In the radial direction Dr, a side closer to the axis Ar will be referred to as a radial inner side Dri, and a side away from the axis Ar will be referred to as a radial outer side Dro.

The compressor rotor 11 has a rotor shaft 12 extending in the axial direction Da around the axis Ar, and a plurality of rotor blade rows 13 attached to the rotor shaft 12. The plurality of rotor blade rows 13 are aligned with each other in the axial direction Da. The respective rotor blade rows 13 are all configured to include a plurality of rotor blades aligned with each other in the circumferential direction Dc. A stator blade row 14 is located on each axial downstream side Dad of the plurality of rotor blade rows 13. The respective stator blade rows 14 are disposed inside the compressor casing 18. The respective stator blade rows 14 are all configured to include a plurality of stator blades aligned with each other in the circumferential direction Dc. A space between the radial outer side Dro of the rotor shaft 12 and the radial inner side Dri of the compressor casing 18, that is, an annular space in a region where the stator blade row 14 and the rotor blade row 13 are located in the axial direction Da forms an air compression flow path 19 in which the air is compressed while the air flows. That is, the compressor 10 is an axial flow multi-stage compressor.

The compressor casing 18 has a compressor body casing 18a and an intermediate casing 18b. The compressor body casing 18a covers an outer peripheral side in a region where the stator blade row 14 and the rotor blade row 13 are located in the axial direction Da. The intermediate casing 18b is connected to the axial downstream side Dad of the compressor body casing 18a. The compressed air discharged from the compressor body casing 18a flows into the intermediate casing 18b.

The inlet guide vane (IGV) 21 is disposed in the compressor body casing 18a. The IGV 21 has a plurality of movable blades 22 and a driver 23 that changes an angle of the plurality of movable blades 22. The plurality of movable blades 22 are located on the axial upstream side Dau from the rotor blade row 13 most upstream on the axial side Dau out of the plurality of rotor blade rows 13.

The turbine 40 has a turbine rotor 41 that rotates around the axis Ar, a turbine casing 48 that covers the turbine rotor 41, and a plurality of stator blade rows 53. The turbine rotor 41 has a rotor shaft 42 extending in the axial direction Da around the axis Ar, and a plurality of rotor blade rows 43 attached to the rotor shaft 42. The plurality of rotor blade rows 43 are aligned with each other in the axial direction Da. The respective rotor blade rows 43 are all configured to include a plurality of rotor blades 44 aligned with each other in the circumferential direction Dc. A stator blade row 53 is located on each axial upstream side Dau of the plurality of rotor blade rows 43. The respective stator blade rows 53 are disposed inside the turbine casing 48. The respective stator blade rows 53 are all configured to include a plurality of stator blades 54 aligned with each other in the circumferential direction Dc. A space between an outer peripheral side of the rotor shaft 42 and an inner peripheral side of the turbine casing 48, that is, an annular space in a region where the stator blade row 53 and the rotor blade row 43 are located in the axial direction Da forms a combustion gas flow path 49 in which combustion gas flows from the combustor 30. In the following description, out of the plurality of rotor blade rows 43, the rotor blade row most upstream on the axial side will be referred to as a first rotor blade row, and the rotor blade rows toward the axial downstream side will be referred to as a second rotor blade row, a third rotor blade row, and so forth.

The combustor 30 is disposed in the intermediate casing 18b as illustrated in FIG. 2. The combustor 30 has a combustion cylinder (or a tail cylinder) 31 that feeds high-temperature and high-pressure combustion gas G into the combustion gas flow path 49 of the turbine 40, and a fuel injector 32 that injects a fuel F together with the compressed air fed from the compressor 10 into the combustion cylinder 31. A fuel line 35 through which the fuel F flows is connected to the fuel injector 32. The fuel line 35 has a fuel control valve (operation terminal) 36.

As illustrated in FIG. 1, the compressor rotor 11 and the turbine rotor 41 are located on the same axis Ar, and are connected to each other, thereby forming a gas turbine rotor 2. A rotor of the generator 9 is connected to the gas turbine rotor 2. In addition, the compressor casing 18 and the turbine casing 48 are connected to each other, thereby forming a gas turbine casing 5. The intermediate casing 18b in the compressor casing 18 according to the present embodiment will be referred to as a combustor compartment, and a part which does not include the combustor compartment (intermediate casing 18b) in the compressor casing 18 according to the present embodiment will be simply referred to as a compressor casing, in some cases. However, in the present application, a part including the combustor compartment (intermediate casing 18b) will be referred to as the compressor casing 18.

In the present embodiment, the gas turbine 1 including the gas turbine rotor 2 rotating around the axis Ar and the gas turbine casing 5 that covers the gas turbine rotor 2 forms an axial flow type rotating machine.

As illustrated in FIGS. 1 and 2, the cooling device 60 has an air bleeding line 61, a cooler 62, and a cooling controller 64. The air bleeding line 61 has a first terminal and a second terminal. The first terminal of the air bleeding line 61 is connected to the intermediate casing 18b, and the second terminal is connected via the rotor shaft 42 of the turbine rotor 41 to first row rotor blades 44a which are a plurality of rotor blades configuring the first rotor blade row. The air bleeding line 61 guides the compressed air discharged from the compressor body casing 18a and flowing into the intermediate casing 18b to the plurality of first row rotor blades 44a. The cooler 62 is a heat exchanger that cools the compressed air by exchanging heat between the compressed air flowing into the air bleeding line 61 and a cooling medium. A medium line 63 through which the cooling medium flows is connected to the cooler 62. The cooling controller 64 is disposed in the medium line 63. The cooling controller 64 is a flow rate control valve that controls a cooling amount of the compressed air by controlling a flow rate of the cooling medium flowing in the medium line 63.

Figure 3:
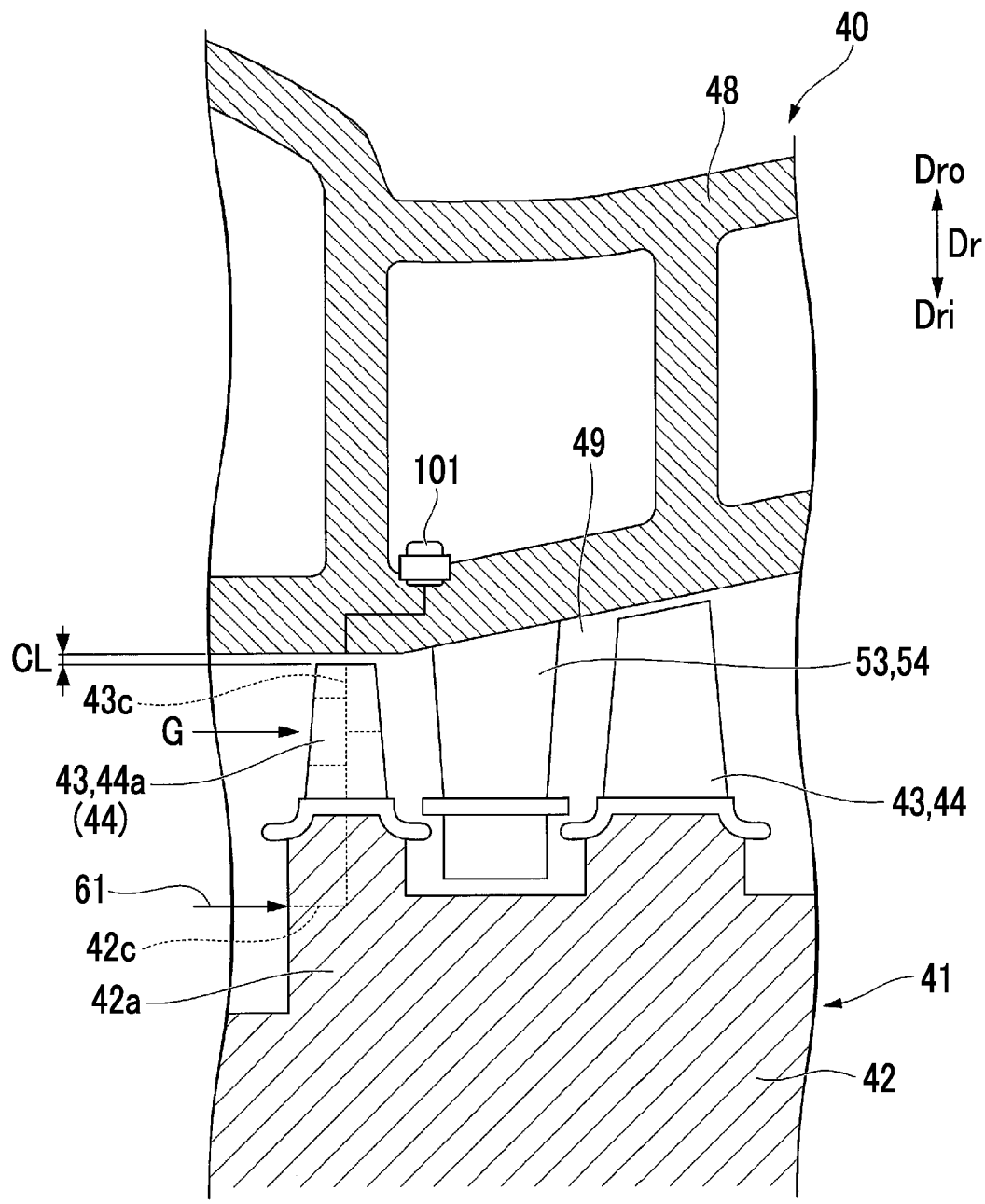
FIG. 3 is an enlarged view illustrating a part III in FIG. 2.

As illustrated in FIGS. 2 and 3, the air bleeding line 61 is connected to a first step shaft portion 42a to which the first rotor blade row is fixed in the rotor shaft 42 of the turbine rotor 41. The first step shaft portion 42a has a cooling passage 42c that communicates with the air bleeding line 61. In addition, a cooling passage 44c that communicates with the cooling passage 42c of the first step shaft portion 42a is formed in the plurality of first row rotor blades 44a configuring the first rotor blade row. The cooling passage 44c of the first row rotor blade 44a is open in a portion that comes into contact with the combustion gas G on a surface of the first row rotor blade 44a. Therefore, the compressed air fed from the compressor 10 is cooled by the cooler in a process of flowing in the air bleeding line 61. Thereafter, the compressed air is discharged into the combustion gas flow path 49 via the cooling passage 42c formed in the first step shaft portion 42a and the cooling passage 44c formed in the first row rotor blade 44a.

Out of configuration components of the gas turbine 1, the rotor blade 44, the stator blade 54, components that form the inner peripheral surface in the turbine casing 48, and the combustion cylinder 31 are all high-temperature components that come into contact with the high-temperature combustion gas G. According to the present embodiment, the first row rotor blade 44a is cooled by cooling air Am that is the compressed air cooled by the cooler 62 out of the high-temperature components.

The cooler 62 according to the present embodiment is a heat exchanger. However, for example, the cooler 62 may adopt a type in which the compressed air is cooled by causing a fan to send the air to a line through which the compressed air passes. In this case, for example, the cooling controller is a motor equipped with an inverter for changing a rotation speed RPM of the fan.

As illustrated in FIG. 1, the control device 100 has a fuel control valve 36, a clearance measuring instrument 101, a rotation speed meter 102, an output meter 103, and a control device body 110. The clearance measuring instrument 101 measures a clearance amount CL between the turbine casing 48 and the turbine rotor 41. The rotation speed meter 102 measures a rotation speed RPM of the gas turbine rotor 2. The output meter 103 measures an output PW of the gas turbine 1, in other words, a power generation amount of the generator. Both the rotation speed meter 102 and the output meter 103 are examples of parameter meters.

As illustrated in FIG. 3, there is a clearance between the rotor blade 44 of the turbine rotor 41 that rotates around the axis Ar and the turbine casing 48 that covers the turbine rotor 41. The clearance measuring instrument 101 according to the present embodiment measures the clearance amount CL between the first row rotor blade 44a and the turbine casing 48. The clearance measuring instrument 101 is fixed to the turbine casing 48. For example, the clearance measuring instrument 101 is a capacitance type measuring instrument that measures capacitance between the first row rotor blade 44a and the turbine casing 48 so as to convert a measured capacitance value into the clearance amount. For example, the clearance measuring instrument 101 may be a measuring instrument that detects a temperature of the turbine casing 48 so as to convert the detected temperature into the clearance amount. The clearance measuring instrument 101 may measure the clearance amount between the second row rotor blade 44 and the turbine casing 48. Furthermore, the clearance measuring instrument 101 may measure the clearance amount between the first row rotor blade 44a and the turbine casing 48 and the clearance amount between the second row rotor blade 44 and the turbine casing 48.

Figure 4:
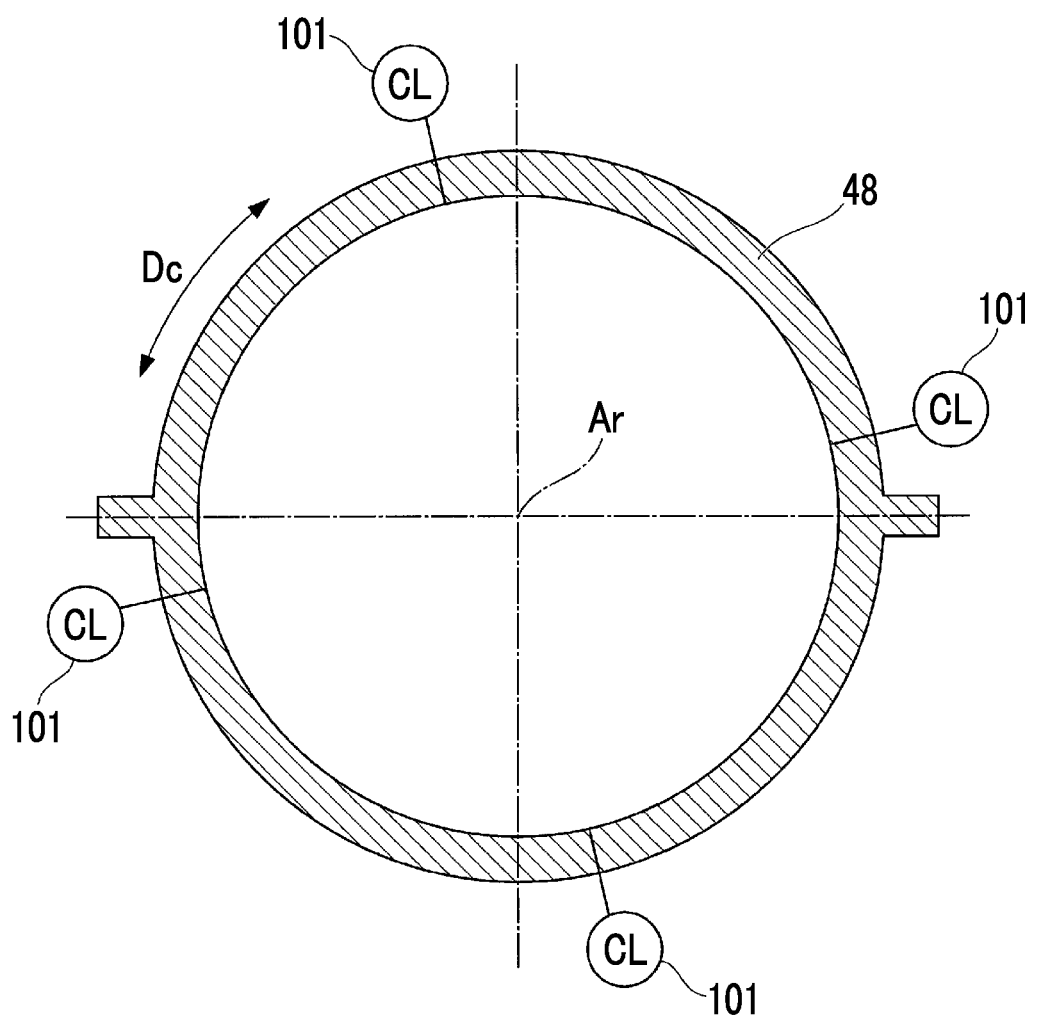
FIG. 4 is a view for describing an arrangement of a plurality of clearance measuring instruments according to the first embodiment of the present invention.

As illustrated in FIG. 4, the control device 100 according to the present embodiment includes the plurality of clearance measuring instruments 101. Out of the plurality of clearance measuring instruments 101, one clearance measuring instrument 101 is disposed in an upper portion of the turbine casing 48. Another clearance measuring instrument 101 is disposed in a lower portion of the turbine casing 48. Still another clearance measuring instrument 101 is disposed in an approximately central portion in an upward-downward direction of the turbine casing 48 and in a right side portion from the axis Ar. Still further another clearance measuring instrument 101 is disposed in an approximately central portion in the upward-downward direction of the turbine casing 48 and in a left side portion from the axis Ar.

Figure 5:
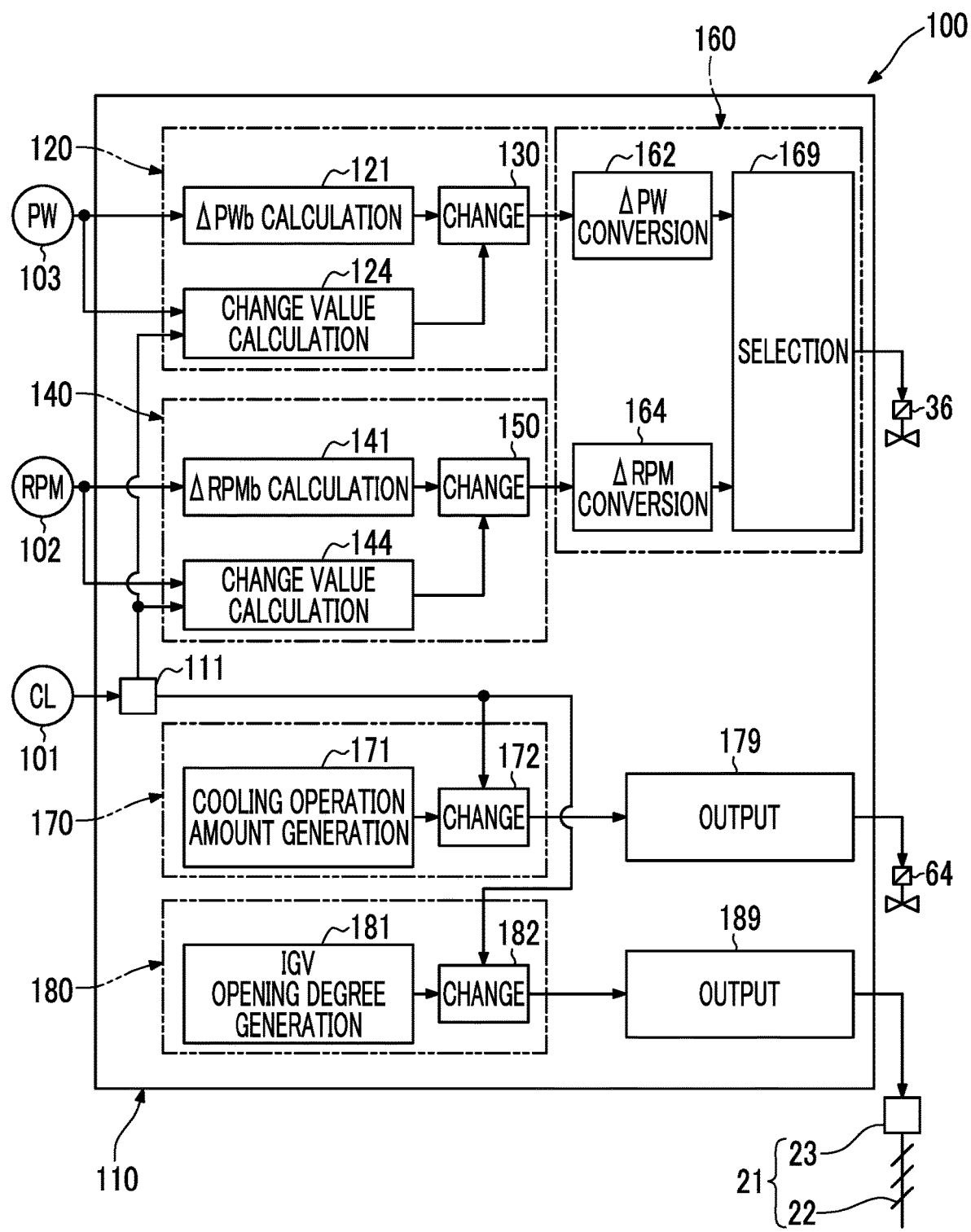
FIG. 5 is a functional block diagram illustrating a configuration of a control device according to the first embodiment of the present invention.

As illustrated in FIG. 5, the control device body 110 functionally, has a clearance signal processing unit 111, an output change rate setting unit 120, a rotation speed change rate setting unit 140, a fuel operation amount output unit 160, a cooling operation amount setting unit 170, a cooling operation amount output unit 179, an intake air operation amount setting unit 180, and an intake air operation amount output unit 189.

The clearance signal processing unit 111 receives a signal output from the plurality of clearance measuring instruments 101, and outputs the minimum clearance amount CL out of the clearance amounts CL measured by the plurality of clearance measuring instruments 101.

The output change rate setting unit 120 has a basic output change rate calculation unit 121, a change value calculation unit 124, and a change unit 130. The basic output change rate calculation unit 121 obtains a basic output change rate $\Delta PWb$, based on a deviation between a target output PWt determined in accordance with a load command or an actuation command and an output PW measured by the output meter 103. The change value calculation unit 124 obtains a change value for changing the basic output change rate $\Delta PWb$ in accordance with the clearance amount CL output from the clearance signal processing unit 111. The change unit 130 changes the basic output change rate $\Delta PWb$ by using the change value. The change rate of an output PW is a change amount of the output PW per unit time.

The rotation speed change rate setting unit 140 has a basic rotation speed change rate calculation unit 141, a change value calculation unit 144, and a change unit 150. The basic rotation speed change rate calculation unit 141 obtains a basic rotation speed change rate $\Delta RPMb$, based on a deviation between a target rotation speed RPMt determined in accordance with the load command or the actuation command and the rotation speed RPM measured by the rotation speed meter 102. The change value calculation unit 144 obtains a change value for changing the basic rotation speed change rate ΔRPMb in accordance with the clearance amount CL output from the clearance signal processing unit 111. The change unit 150 changes the basic rotation speed change rate ΔRPMb by using the change value. The change rate of the rotation speed RPM is a change amount of the rotation speed RPM per unit time.

The fuel operation amount output unit 160 has an output change rate conversion unit 162, a rotation speed change rate conversion unit 164, and a selection unit 169. The output change rate conversion unit 162 converts an output change rate ΔPW set by the output change rate setting unit 120 into an operation amount of the fuel control valve 36 which is an operation terminal. The rotation speed change rate conversion unit 164 converts a rotation speed change rate ΔRPM set by the rotation speed change rate setting unit 140 into an operation amount of the fuel control valve 36 which is an operation terminal. The selection unit 169 outputs only the operation amount obtained by the output change rate conversion unit 162 and one operation amount out of the operation amounts obtained by the rotation speed change rate conversion unit 164, to the fuel control valve 36.

The cooling operation amount setting unit 170 has a cooling operation amount generation unit 171 and a change unit 172. For example, the cooling operation amount generation unit 171 generates a cooling operation amount which is an operation amount of the cooling controller 64. Here, the cooling operation amount generation unit 171 generates the operation amount of the fuel control valve 36 which is output from the fuel operation amount output unit 160, in other words, the cooling operation amount which increases as the fuel flow rate increases. The change unit 172 changes the cooling operation amount in accordance with the clearance amount CL output from the clearance signal processing unit 111. The cooling operation amount output unit 179 outputs the changed cooling operation amount to the cooling controller 64.

The intake air operation amount setting unit 180 has an IGV opening degree generation unit 181 and a change unit 182. The IGV opening degree generation unit 181 generates an IGV opening degree which is an opening degree of the IGV 21. Here, the IGV opening degree generation unit 181 generates the operation amount of the fuel control valve 36 output from the fuel operation amount output unit 160, in other words, the IGV opening degree which increases as the fuel flow rate increases. The change unit 182 changes the IGV opening degree in accordance with the clearance amount CL output from the clearance signal processing unit 111. The intake air operation amount output unit 189 outputs the changed IGV opening degree to the driver 23 of the IGV 21.

Figure 6:
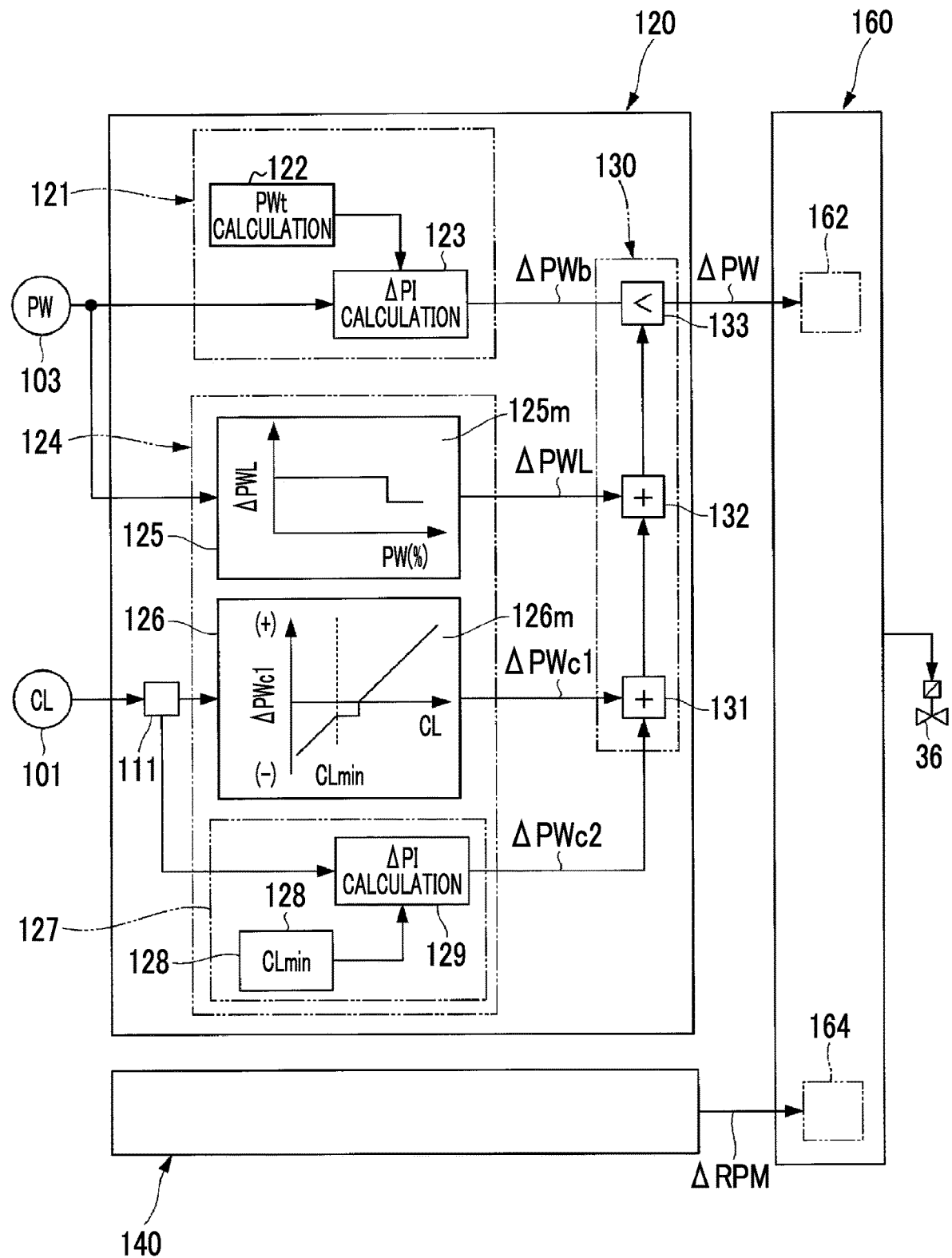
FIG. 6 is a functional block diagram illustrating a configuration of an output change rate setting unit according to the first embodiment of the present invention.

As illustrated in FIG. 6, the basic output change rate calculation unit 121 has a target output calculation unit 122 and a ΔPI calculation unit 123. The target output calculation unit 122 obtains a target output PWt in accordance with the load command or the actuation command. The ΔPI calculation unit 123 obtains a deviation between the output PW measured by the output meter 103 and the target output PWt, and obtains a basic output change rate ΔPWb which is a proportional and integral controlled variable (PI controlled variable) corresponding to the deviation.

The change value calculation unit 124 of the output change rate setting unit 120 has an upper limit output change rate calculation unit 125, a first change value calculation unit (first calculation unit) 126, and a second change value calculation unit (second calculation unit) 127. The upper limit output change rate calculation unit 125 has a map 125m indicating a relationship between the actual output PW and an upper limit output change rate ΔPWL which is an upper limit value of the output change rate ΔPW. The upper limit output change rate calculation unit 125 uses the map 125m to obtain the upper limit output change rate ΔPWL corresponding to the output PW measured by the output meter 103. The first change value calculation unit 126 of the output change rate setting unit 120 has a map 126m indicating a relationship between the clearance amount CL and a first change value ΔPWc1 for changing the basic output change rate ΔPWb. The first change value calculation unit 126 uses the map 126m to obtain the first change value ΔPWc1 corresponding to the clearance amount CL output from the clearance signal processing unit 111. The relationship indicated by the map 126m is basically a relationship in which the first change value ΔPWc1 increases as the clearance amount CL increases. Therefore, the first change value ΔPWc1 obtained by the first change value calculation unit 126 increases as the clearance amount CL increases. Furthermore, in the map 126m, in a case where the clearance amount CL is larger than an allowable minimum clearance amount CLmin, the first change value ΔPWc1 indicates a positive value. In a case where the clearance amount CL is equal to or smaller than the allowable minimum clearance amount CLmin, the first change value ΔPWc1 indicates a negative value. The allowable minimum clearance amount CLmin is an allowable minimum value relating to the clearance amount. The second change value calculation unit 127 of the output change rate setting unit 120 has an allowable minimum value storage unit 128 and a ΔPI calculation unit 129. The allowable minimum value storage unit 128 stores the allowable minimum clearance amount CLmin. The ΔPI calculation unit 129 obtains a deviation between the allowable minimum clearance amount CLmin and the clearance amount CL output from the clearance signal processing unit 111, and obtains a second change value ΔPWc2 which is a proportional and integral controlled variable (PI controlled variable) corresponding to the deviation. Therefore, the second change value ΔPWc2 obtained by the second change value calculation unit 127 increases as the deviation increases between the allowable minimum clearance amount CLmin and the clearance amount CL.

The change unit 130 of the output change rate setting unit 120 has a first adder 131, a second adder 132, and a minimum value selector 133. The first adder 131 adds the first change value ΔPWc1 obtained by the first change value calculation unit 126 and the second change value ΔPWc2 obtained by the second change value calculation unit 127. The second adder 132 adds the upper limit output change rate ΔPWL obtained by the upper limit output change rate calculation unit 125 and the output from the first adder 131. That is, the second adder 132 outputs a value obtained by adding the first change value ΔPWc1, the second change value ΔPWc2, and the upper limit output change rate ΔPWL. The minimum value selector 133 selects a smaller value out of the basic output change rate ΔPWb obtained by the basic output change rate calculation unit 121 and the output value from the second adder 132, and outputs the smaller value as the output change rate ΔPW. The output change rate ΔPW output from the minimum value selector 133 is input to the output change rate conversion unit 162 of the fuel operation amount output unit 160 described above.

Figure 7:
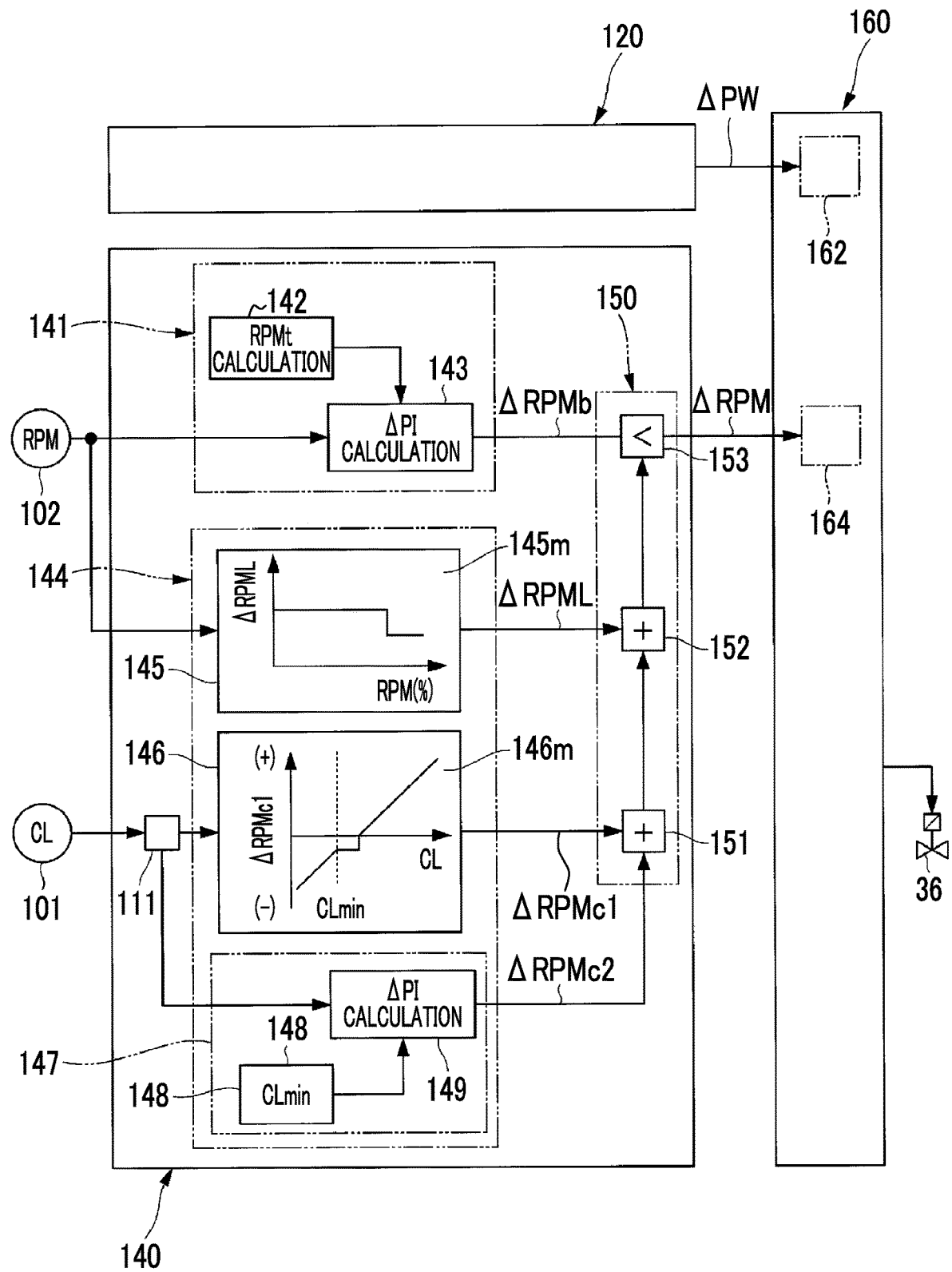
FIG. 7 is a functional block diagram illustrating a configuration of a rotation speed change rate setting unit according to the first embodiment of the present invention.

As illustrated in FIG. 7, the basic rotation speed change rate calculation unit 141 has a target rotation speed calculation unit 142 and a ΔPI calculation unit 143. The target rotation speed calculation unit 142 obtains a target rotation speed RPMt in accordance with the load command or the actuation command. The ΔPI calculation unit 143 obtains a deviation between the rotation speed RPM measured by the rotation speed meter 102 and the target rotation speed RPMt, and obtains a basic rotation speed change rate ΔRPMb which is a proportional and integral controlled variable (PI controlled variable) corresponding to the deviation.

The change value calculation unit 144 of the rotation speed change rate setting unit 140 has an upper limit rotation speed change rate calculation unit 145, a first change value calculation unit 146, and a second change value calculation unit 147. The upper limit rotation speed change rate calculation unit 145 has a map 145m indicating a relationship between the actual rotation speed RPM and the upper limit rotation speed change rate ΔRPML which is an upper limit value of the rotation speed change rate ΔRPM. The upper limit rotation speed change rate calculation unit 145 uses the map 145m to obtain the upper limit rotation speed change rate ΔRPML corresponding to the rotation speed RPM measured by the rotation speed meter 102. The first change value calculation unit 146 of the rotation speed change rate setting unit 140 has a map 146m indicating a relationship between the clearance amount CL and a first change value ΔRPMc1 for changing the basic rotation speed change rate ΔRPMb. The first change value calculation unit 146 uses the map 146m to obtain the first change value ΔRPMc1 corresponding to the clearance amount CL output from the clearance signal processing unit 111. The relationship indicated by the map 146m is basically a relationship in which the first change value ΔRPMc1 increases as the clearance amount CL increases. Therefore, the first change value ΔRPMc1 obtained by the first change value calculation unit 146 increases as the clearance amount CL increases. Furthermore, in the map 146m, in a case where the clearance amount CL is larger than the allowable minimum clearance amount CLmin, the first change value ΔRPMc1 indicates a positive value. In a case where the clearance amount CL is equal to or smaller than the allowable minimum clearance amount CLmin, the first change value ΔRPMc1 indicates a negative value. The second change value calculation unit 147 of the rotation speed change rate setting unit 140 has an allowable minimum value storage unit 148 and a ΔPI calculation unit 149. The allowable minimum value storage unit 148 stores the allowable minimum clearance amount CLmin. The ΔPI calculation unit 149 obtains a deviation between the allowable minimum clearance amount CLmin and the clearance amount CL output from the clearance signal processing unit 111, and obtains a second change value ΔRPMc2 which is a proportional and integral controlled variable (PI controlled variable) corresponding to the deviation. Therefore, the second change value ΔRPMc2 obtained by the second change value calculation unit 147 increases as the deviation increases between the allowable minimum clearance amount CLmin and the clearance amount CL.

The change unit 150 of the rotation speed change rate setting unit 140 has a first adder 151, a second adder 152, and a minimum value selector 153. The first adder 151 adds the first change value ΔRPMc1 obtained by the first change value calculation unit 146 and the second change value ΔRPMc2 obtained by the second change value calculation unit 147. The second adder 152 adds the upper limit rotation speed change rate ΔRPML obtained by the upper limit rotation speed change rate calculation unit 145 and the output from the first adder 151. That is, the second adder 152 outputs a value obtained by adding the first change value ΔRPMc1, the second change value ΔRPMc2, and the upper limit rotation speed change rate ΔRPML. The minimum value selector 153 selects a smaller value out of the basic rotation speed change rate ΔRPMb obtained by the basic rotation speed change rate calculation unit 141 and the output value from the second adder 152, and outputs the smaller value as the rotation speed change rate ΔRPM. The rotation speed change rate ΔRPM output from the minimum value selector 153 is input to the rotation speed change rate conversion unit 164 of the fuel operation amount output unit 160 described above.

Figure 8:
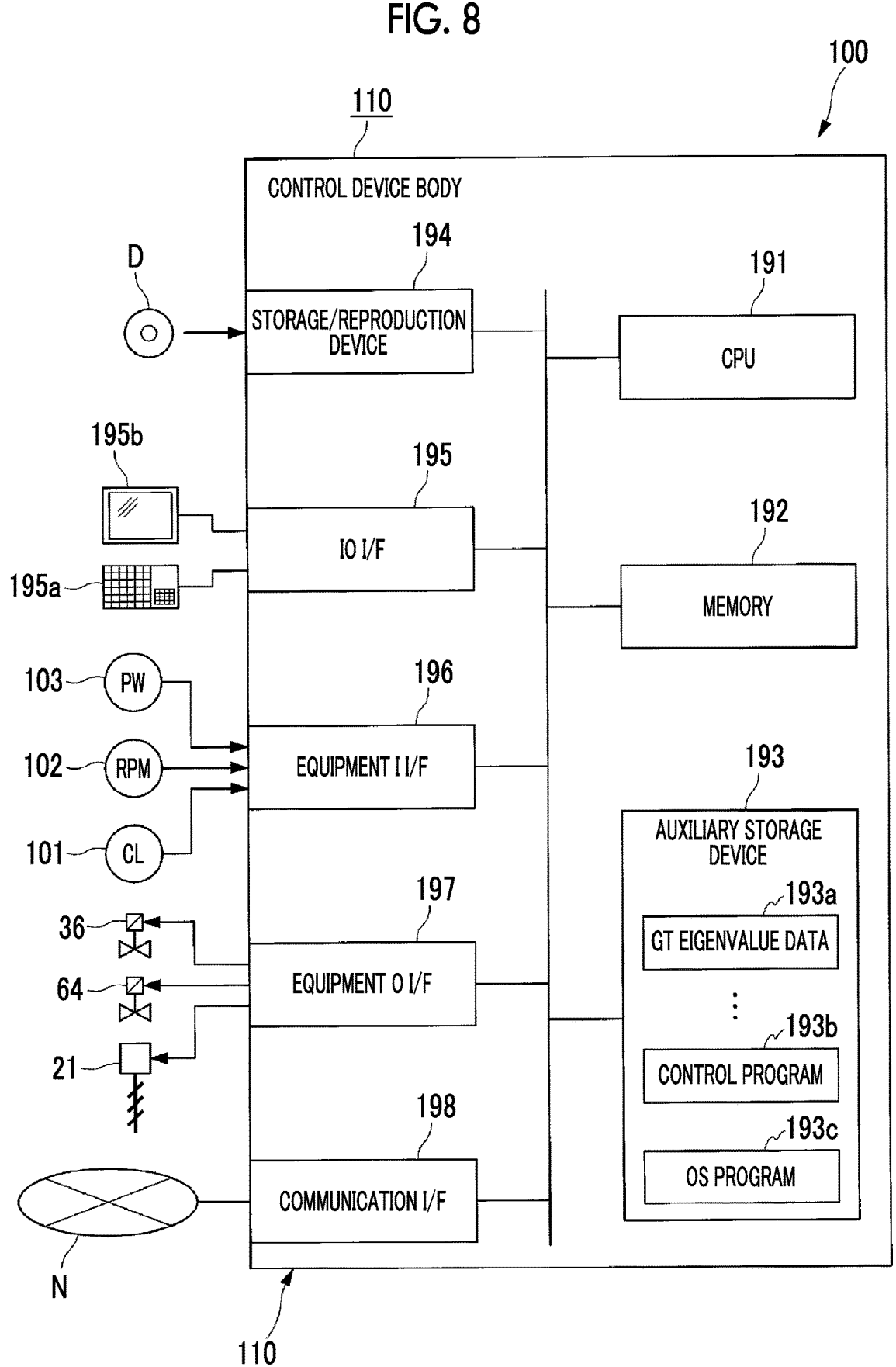
FIG. 8 is a circuit block diagram illustrating a hardware configuration of the control device according to the first embodiment of the present invention.

The control device body 110 is a computer as illustrated in FIG. 8. Therefore, the control device body 110 includes a CPU 191 that performs various calculations, a memory 192 serving as a work area of the CPU 191, an auxiliary storage device 193 such as a hard disk drive device, a manual input device 195a such as a keyboard and a mouse, a display device 195b, an input and output interface 195 for the manual input device 195a and the display device 195b, and an equipment input interface 196 to which signals from various sensors installed in the gas turbine 1 are input, an equipment output interface 197 for outputting the operation amount to various operation terminals of the gas turbine 1, a communication interface 198 for communicating with external devices via a network N, and a storage/reproduction device 194 for performing data storage processing and reproduction processing on a disk type storage medium D.

The auxiliary storage device 193 stores gas turbine eigenvalue data 193a, a control program 193b, and an operating system (OS) program 193c in advance. Examples of the gas turbine eigenvalue data 193a include various maps 125m, 126m, 145m, and 146m described above and the allowable minimum clearance amount CLmin. The control program 193b is a program for controlling the gas turbine 1 serving as the rotating machine. Various data and programs stored in the auxiliary storage device 193 are incorporated into the auxiliary storage device 193 from the disk type storage medium D via the storage/reproduction device 194, for example. Various data and programs may be incorporated into the auxiliary storage device 193 from an external device via the communication interface 198. Various data and programs may be incorporated into the auxiliary storage device 193 from the manual input device 195a via the input and output interface 195.

The CPU 191 develops the control program 193b stored in the auxiliary storage device 193 on the memory 192, and executes the control program 193b, thereby realizing each functional configuration of the control device body 110.

Next, an operation of the gas turbine power generation plant according to the present embodiment will be described.

First, a basic operation of the gas turbine 1 will be described. The compressor 10 of the gas turbine 1 compresses air A to generate the compressed air. The compressed air is supplied to the combustor 30. The fuel F is also supplied to the combustor 30. The fuel injector 32 of the combustor 30 injects the fuel F and the compressed air into the combustion cylinder 31. Inside the combustion cylinder 31, the fuel F is combusted in the compressed air, thereby generating the high-temperature and high-pressure combustion gas G. The combustion gas G is fed from the combustion cylinder 31 to the combustion gas flow path 49 inside the turbine 40, thereby rotating the turbine rotor 41. The generator 9 connected to the turbine rotor 41 generates power by rotating the turbine rotor 41.

Next, an operation of the control device 100 will be described.

First, an operation of the control device 100 in an actuation step will be described. The actuation step is a step until the generator 9 is connected to a power system after the rotation speed RPM of the gas turbine 1 reaches a rated rotation speed (for example, 3,600 rpm) in a state where the fuel F is not supplied to the gas turbine 1.

In the actuation step, the gas turbine rotor 2 is rotated by causing the generator 9 to function as the motor. In a case where an actuator is separately provided, the gas turbine rotor 2 is rotated by the actuator.

Figure 9:
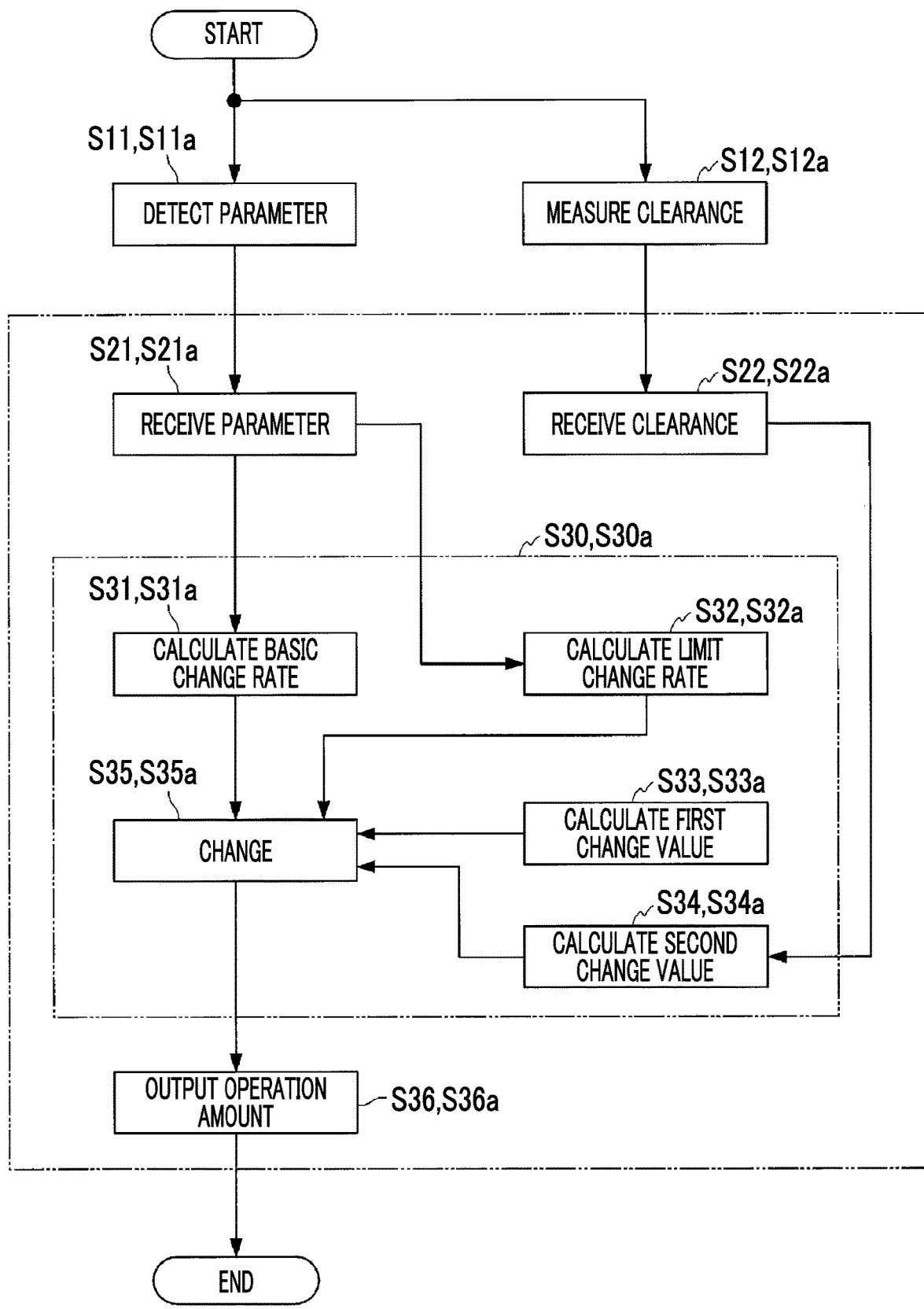
FIG. 9 is a flowchart illustrating an operation of the control device according to the first embodiment of the present invention.

In the actuation step, a step illustrated by a flowchart in FIG. 9 is repeatedly performed. First, the rotation speed meter 102 measures the rotation speed RPM of the gas turbine 1 (S11: parameter measurement step). Furthermore, the plurality of clearance measuring instruments 101 measure the clearance amount CL (S12: clearance measurement step). The rotation speed change rate setting unit 140 of the control device body 110 receives the rotation speed RPM from the rotation speed meter 102 (S21: parameter receiving step). In addition, the clearance signal processing unit 111 of the control device body 110 receives signals from the plurality of clearance measuring instruments 101, and outputs the smallest clearance amount CL out of the clearance amounts CL measured by the plurality of clearance measuring instruments 101 (S22: clearance receiving step).

Next, the rotation speed change rate setting unit 140 determines the rotation speed change rate $\Delta$RPM of the gas turbine 1 (S30: parameter change rate setting step). In the parameter change rate setting step (S30), a basic change rate calculation step (S31), an upper limit change rate calculation step (S32), a first change value calculation step (S33), a second change value calculation step (S34), and a change step (S35) are performed.

In the basic change rate calculation step (S31), the target rotation speed calculation unit 142 first obtains the target rotation speed RPMt in accordance with the actuation command. The $\Delta$PI calculation unit 143 of the basic rotation speed change rate calculation unit 141 obtains a deviation between the rotation speed RPM measured by the rotation speed meter 102 and the target rotation speed RPMt, and obtains a basic rotation speed change rate $\Delta$RPMb which is a proportional and integral controlled variable (PI controlled variable) corresponding to the deviation.

In the upper limit change rate calculation step (S32), the upper limit rotation speed change rate calculation unit 145 uses the map 145m described with reference to FIG. 7 so as to obtain the upper limit rotation speed change rate $\Delta$RPML corresponding to the rotation speed RPM measured by the rotation speed meter 102.

In the first change value calculation step (S33), the first change value calculation unit 146 of the rotation speed change rate setting unit 140 uses the map 146m described with reference to FIG. 7 so as to obtain the first change value $\Delta$RPMc1 corresponding to the clearance amount CL output from the clearance signal processing unit 111. As described above, the first change value $\Delta$RPMc1 increases as the clearance amount CL increases.

The second change value calculation step (S34) is performed by the second change value calculation unit 147 of the rotation speed change rate setting unit 140. The $\Delta$PI calculation unit 149 of the second change value calculation unit 147 obtains a deviation between the allowable minimum clearance amount CLmin stored in the allowable minimum value storage unit 148 and the clearance amount CL output from the clearance signal processing unit 111, and obtains the second change value $\Delta$RPMc2 which is a proportional and integral controlled variable (PI controlled variable) corresponding to the deviation. As described above, the second change value $\Delta$RPMc2 increases as the deviation increases between the allowable minimum clearance amount CLmin and the clearance amount CL.

In the change step (S35), the change unit 150 of the rotation speed change rate setting unit 140 changes the basic rotation speed change rate $\Delta$RPMb. The first adder 151 of the change unit 150 adds the first change value $\Delta$RPMc1 and the second change value $\Delta$RPMc2. The second adder 152 of the change unit 150 adds the upper limit rotation speed change rate $\Delta$RPML obtained by the upper limit rotation speed change rate calculation unit 145 and the output from the first adder 151. The minimum value selector 153 of the change unit 150 selects a smaller value out of the basic rotation speed change rate $\Delta$RPMb and the output value from the second adder 152, and outputs the smaller value as the rotation speed change rate $\Delta$RPM to the rotation speed change rate conversion unit 164 of the fuel operation amount output unit 160.

According to the above-described procedure, the parameter change rate setting step is completed (S30).

Next, the fuel operation amount output unit 160 outputs the operation amount to the fuel control valve 36 (S36: operation amount output step). The rotation speed change rate conversion unit 164 of the fuel operation amount output unit 160 converts the rotation speed change rate $\Delta$RPM set by the rotation speed change rate setting unit 140 into the operation amount of the fuel control valve 36. The operation amount is output to the fuel control valve 36 via the selection unit 169. As a result, the fuel F having a fuel flow rate which can obtain the rotation speed change rate $\Delta$RPM set in the parameter change rate setting step (S30) is supplied to the combustor 30.

As described above, the rotation speed RPM of the gas turbine rotor 2 gradually increases as a result of repeatedly performing the above-described step. Then, if the rotation speed RPM of the gas turbine 1 reaches a rated rotation speed (for example, 3,600 rpm) and the generator 9 is connected to a power system, the actuation step is completed.

When the actuation step is completed, a load operation step is performed. Even in the load operation step, a step similar to the actuation step is repeatedly performed.

In the load operation step, a step illustrated by a flowchart in FIG. 9 is repeatedly performed. First, the output meter 103 measures the output PW of the gas turbine 1 (S11a: parameter measurement step). Furthermore, the plurality of clearance measuring instruments 101 measure the clearance amount CL (S12a: clearance measurement step). The output change rate setting unit 120 of the control device body 110 receives the output PW from the output meter 103 (S21a: parameter receiving step). In addition, the clearance signal processing unit 111 of the control device body 110 receives signals from the plurality of clearance measuring instruments 101, and outputs the smallest clearance amount CL out of the clearance amounts CL measured by the plurality of clearance measuring instruments 101 (S22a: clearance receiving step).

Next, the output change rate setting unit 120 determines the output change rate $\Delta$PW of the gas turbine 1 (S30a: parameter change rate setting step). In the parameter change rate setting step (S30a), a basic change rate calculation step (S31a), an upper limit change rate calculation step (S32a), a first change value calculation step (S33a), a second change value calculation step (S34a), and a change step (S35a) are performed.

In the basic change rate calculation step (S31a), the target output calculation unit 122 first obtains the target output PWt in accordance with the load command. The ΔPI calculation unit 123 of the basic output change rate calculation unit 121 obtains a deviation between the output PW measured by the output meter 103 and the target output PWt, and obtains the basic output change rate ΔPWb which is the proportional and integral controlled variable (PI controlled variable) corresponding to the deviation.

In the upper limit change rate calculation step (S32a), the upper limit output change rate calculation unit 125 uses the map 125m described with reference to FIG. 6 so as to obtain the upper limit output change rate ΔPWL corresponding to the output PW measured by the output meter 103.

In the first change value calculation step (S33a), the first change value calculation unit 126 of the output change rate setting unit 120 uses the map 126m described with reference to FIG. 6 so as to obtain the first change value ΔPWc1 corresponding to the clearance amount CL output from the clearance signal processing unit 111. As described above, the first change value ΔPWc1 increases as the clearance amount CL increases.

The second change value calculation step (S34a) is performed by the second change value calculation unit 127 of the output change rate setting unit 120. The ΔPI calculation unit 129 of the second change value calculation unit 127 obtains a deviation between the allowable minimum clearance amount CLmin stored in the allowable minimum value storage unit 128 and the clearance amount CL output from the clearance signal processing unit 111, and obtains the second change value ΔPWc2 which is the proportional and integral controlled variable (PI controlled variable) corresponding to the deviation. As described above, the second change value ΔPWc2 increases as the deviation increases between the allowable minimum clearance amount CLmin and the clearance amount CL.

In the change step (S35a), the change unit 130 of the output change rate setting unit 120 changes the basic output change rate ΔPWb. The first adder 131 of the change unit 130 adds the first change value ΔPWc1 and the second change value ΔPWc2. The second adder 132 of the change unit 130 adds the upper limit output change rate ΔPWL obtained by the upper limit output change rate calculation unit 125 and the output from the first adder 131. The minimum value selector 133 of the change unit 130 selects the smaller value out of the basic output change rate ΔPWb and the output value from the second adder 132, and outputs the smaller value as the output change rate ΔPW to the output change rate conversion unit 162 of the fuel operation amount output unit 160.

According to the above-described procedure, the parameter change rate setting step (S30a) is completed.

Next, the fuel operation amount output unit 160 outputs the operation amount to the fuel control valve 36 (S36a: operation amount output step). The output change rate conversion unit 162 of the fuel operation amount output unit 160 converts the output change rate ΔPW set by the output change rate setting unit 120 into the operation amount of the fuel control valve 36. The operation amount is output to the fuel control valve 36 via the selection unit 169. As a result, the fuel F having the fuel flow rate which can obtain the output change rate ΔPW set in the parameter change rate setting step (S30a) is supplied to the combustor 30.

If the control device body 110 receives a new load command, the above-described step is repeatedly performed until the output PW measured by the output meter 103 reaches a required output indicated by the new load command. If the control device body 110 receives the load command indicating the required output "0", the output PW gradually decreases. When the output PW reaches the predetermined output PW, the generator 9 is electrically disconnected from the power system. Thereafter, the fuel flow rate to be supplied to the combustor 30 becomes "0".

As described above, in the load operation step, in a case where the load command indicating the required output greater than the current output PW is received as a result of repeatedly performing the above-described step, the output PW gradually increases until the output PW reaches the required output. In addition, in a case where the load command indicating the required output smaller than the current output PW is received, the output PW gradually decreases until the output PW reaches the required output.

Figure 10:
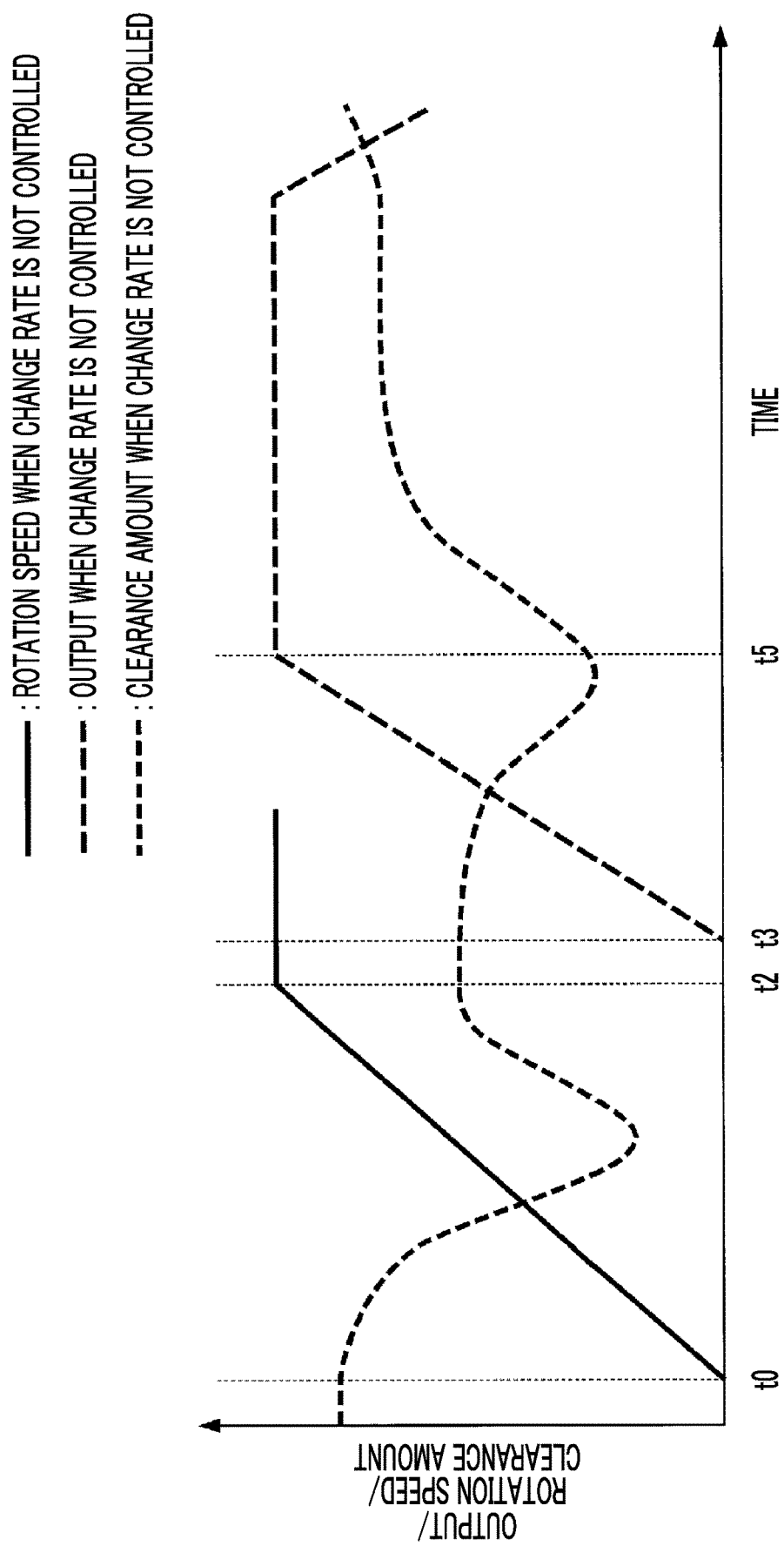
FIG. 10 is a graph illustrating a change in an output, a change in a rotation speed, and a change in a clearance with the lapse of time in a case where change rate controlling based on a clearance amount is not performed in the gas turbine according to the first embodiment of the present invention.

Next, referring to FIG. 10, a change in the rotation speed RPM, the output PW, and the clearance amount CL when the parameter change rate is not controlled based on the above-described clearance amount CL will be described.

If the control device 100 receives the actuation command at time t0, the rotation speed RPM gradually increases from time t0.

At the beginning of the actuation step, a deviation between the actual rotation speed RPM and the target rotation speed RPMt of the gas turbine 1 is extremely large. Accordingly, the basic rotation speed change rate ΔRPMb obtained by the basic rotation speed change rate calculation unit 141 has an extremely great value. Therefore, at the beginning of the actuation step, the output value from the second adder 152 is smaller in the basic rotation speed change rate ΔRPMb and the output value from the second adder 152. Therefore, the minimum value selector 153 of the change unit 150 selects the output value from the second adder 152, and outputs the output value as the rotation speed change rate ΔRPM to the rotation speed change rate conversion unit 164 of the fuel operation amount output unit 160.

In addition, at the end of the actuation step, the deviation between the actual rotation speed RPM and the target rotation speed RPMt of the gas turbine 1 becomes smaller. Accordingly, the basic rotation speed change rate ΔRPMb obtained by the basic rotation speed change rate calculation unit 141 is smaller than an initial value in the actuation step. Therefore, at the end of the actuation step, a difference between the basic rotation speed change rate ΔRPMb and the output value from the second adder 152 is smaller than the initial value in the actuation step. Therefore, the minimum value selector 153 of the change unit 150 may select the output value from the second adder 152, and may output the output value as the rotation speed change rate ΔRPM in some cases. Alternatively, the minimum value selector 153 of the change unit 150 may select the basic rotation speed change rate ΔRPMb, and may output the basic rotation speed change rate ΔRPMb as the rotation speed change rate ΔRPM in some cases.

Here, in order to simplify the following description, it is assumed that the output value from the second adder 152 is smaller than the basic rotation speed change rate ΔRPMb in the actuation step. In this case, the minimum value selector 153 of the change unit 150 selects the output value from the second adder 152, and outputs the output value as the rotation speed change rate ΔRPM to the rotation speed change rate conversion unit 164 of the fuel operation amount output unit 160.

When the change rate is not controlled, the rotation speed change rate setting unit 140 of the change unit 150 does not add the first change value ΔRPMc1 and the second change value ΔRPMc2 which relate to the rotation speed change rate ΔRPM, to the upper limit rotation speed change rate ΔRPML. Therefore, the minimum value selector 153 of the change unit 150 selects the upper limit rotation speed change rate ΔRPML as the output from the second adder 152, and outputs the upper limit rotation speed change rate ΔRPML as the rotation speed change rate ΔRPM to the rotation speed change rate conversion unit 164 of the fuel operation amount output unit 160. The upper limit rotation speed change rate ΔRPML is almost constant. Therefore, the rotation speed RPM linearly increases from when the actuation command is received (t0) until the rotation speed RPM reaches the rated rotation speed.

If the rotation speed RPM reaches the rated rotation speed at time t2, the rotation speed RPM is maintained at the rated rotation speed after time t2. At time t3 subsequent to time t2, the generator 9 is electrically connected to the power system. As a result, the generator generates the output PW from time t3. Thereafter, the output PW increases or decreases in accordance with the required output indicated by the load command.

In the load operation step, the deviation between the actual output PW of the gas turbine 1 and the required output indicated by the load command is large at the beginning of receiving the load command. Accordingly, the basic output change rate ΔPWb obtained by the basic output change rate calculation unit 121 has a great value. Therefore, at the beginning of receiving the load command, the output value from the second adder 132 is smaller in the basic output change rate ΔPWb and the output value from the second adder 132. Therefore, the minimum value selector 133 of the change unit 130 selects the output value from the second adder 132, and outputs the output value as the output change rate ΔPW to the output change rate conversion unit 162 of the fuel operation amount output unit 160.

In addition, if a predetermined time elapses after the load command is received, a deviation decreases between the actual output PW of the gas turbine 1 and the required output indicated by the load command. Accordingly, the basic output change rate ΔPWb obtained by the basic output change rate calculation unit 121 has a smaller value than the initial value when the load command is received. Therefore, if the predetermined time elapses after the load command is received, a difference between the basic output change rate ΔPW and the output value from the second adder 132 is smaller than the initial value when the load command is received. Therefore, the minimum value selector 133 of the change unit 130 may select the output value from the second adder 132, and may output the output value as the output change rate ΔPW in some cases. Alternatively, the minimum value selector 133 of the change unit 130 may select the basic output change rate ΔPWb, and may output the basic output change rate ΔPWb as the output change rate ΔPW in some cases.

Here, in order to simplify the following description, it is assumed that the output value from the second adder 132 is smaller than the basic output change rate ΔPWb in the load operation step. In this case, the minimum value selector 133 of the change unit 130 selects the output value from the second adder 132, and outputs the output value as the output change rate ΔPW to the output change rate conversion unit 162 of the fuel operation amount output unit 160.

When the change rate is not controlled, the change unit 130 of the output change rate setting unit 120 does not add the first change value ΔPWc1 and the second change value ΔPWc2 which relate to the output change rate ΔPW, to the upper limit output change rate ΔPWL. Therefore, the minimum value selector 133 of the change unit 130 selects the upper limit output change rate ΔPWL as the output from the second adder 132, and outputs the upper limit output change rate ΔPWL as the output change rate ΔPW to the output change rate conversion unit 162 of the fuel operation amount output unit 160. The upper limit output change rate ΔPWL is almost constant. Therefore, the output PW linearly increases or decreases from when the load command is received until the output PW reaches the required output indicated by the load command.

If the gas turbine rotor 2 starts to rotate (t0), a centrifugal force acts on the rotor blade 44, and the rotor blade 44 extends to the radial outer side Dro. Therefore, if the gas turbine 1 starts to rotate (t0), the clearance amount CL decreases.

The turbine casing 48 has larger heat capacity than the rotor blade 44. Therefore, a thermal elongation amount per unit time of the turbine casing 48 is smaller than a thermal elongation amount per unit time of the rotor blade 44. Therefore, the fuel supply starts to be supplied to the gas turbine 1, and the high-temperature combustion gas flows into the combustion gas flow path 49 of the turbine 40. Even if the turbine casing 48 and the rotor blade 44 are similarly heated by the combustion gas, the clearance amount CL decreases. If the clearance amount CL decreases to some extent, the clearance amount CL gradually increases on the other hand. During the process, the clearance amount CL is minimized. A point of the minimized clearance amount CL is called a pinch point.

From a point when the output PW starts to increase (t3), the amount of fuel supply to the gas turbine 1 increases. The temperature of the combustion gas flowing in the combustion gas flow path 49 is raised, and the flow rate of the combustion gas also increases. Therefore, if the output PW starts to increase (t3), the clearance amount CL decreases again. After the output PW reaches the required output (t5), if the output PW is maintained without any change, a difference in the thermal elongation between the turbine casing 48 and the rotor blade 44 decreases. Accordingly, the clearance amount CL gradually increases. During the process, the clearance amount CL is minimized. A point of the minimized clearance amount CL is also called a pinch point. If the output is continuously constant for a predetermined time or longer, the clearance amount CL is maintained at a constant value.

If the amount of the fuel supplied to the gas turbine 1 decreases, the rotor blade 44 shrinks in a shorter time compared to the turbine casing 48. Accordingly, the clearance amount CL temporarily increases.

That is, in a case where the required output indicated by the load command is smaller than the current output PW, the clearance amount CL temporarily increases.

Figure 11:
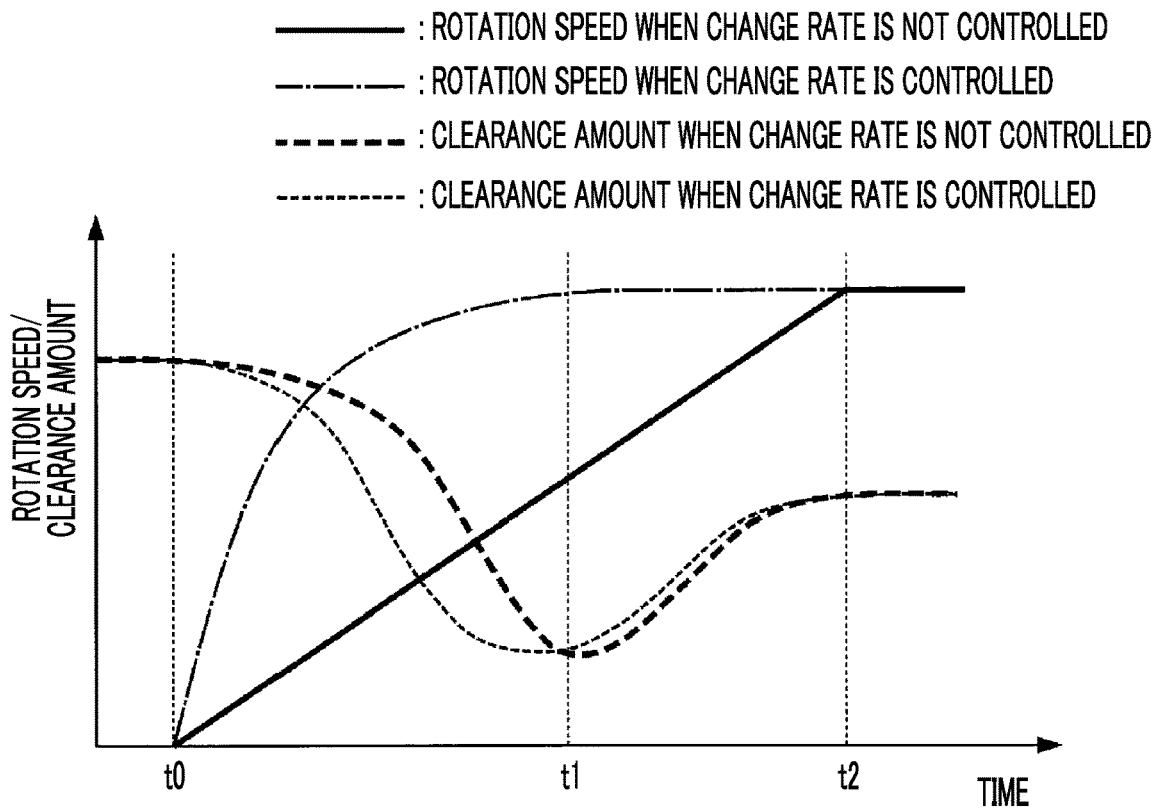
FIG. 11 is a graph illustrating a change in a rotation speed and a change in a clearance with the lapse of time in a case where change rate controlling based on a clearance amount is performed in the gas turbine according to the first embodiment of the present invention.

Next, referring to FIG. 11, a change in the rotation speed RPM and the clearance amount CL when the change rate is controlled based on the above-described clearance amount CL will be described. In the following description, in order to simplify the description, it is assumed that the output value from the second adder 152 of the rotation speed change rate setting unit 140 is smaller than the basic rotation speed change rate ΔRPMb. In this case, the minimum value selector 153 of the change unit 150 selects the output value from the second adder 152, and outputs the output value as the rotation speed change rate ΔRPM to the rotation speed change rate conversion unit 164 of the fuel operation amount output unit 160.

If the rotation speed RPM of the turbine rotor 41 gradually increases from time t0 and reaches the rated rotation speed, the rated rotation speed is maintained. The clearance amount CL at time t0 is much larger than the clearance amount CL and the allowable minimum clearance amount CLmin at the pinch point.

The first change value ΔRPMc1 and the second change value ΔRPMc2 which relate to the rotation speed change rate ΔRPM increase as the clearance amount CL increases. Moreover, in a case where the clearance amount CL is larger than the allowable minimum clearance amount CLmin, the first change value ΔRPMc1 and the second change value ΔRPMc2 are positive values. Therefore, the output value from the second adder 152 at time t0 is a value obtained by adding positive values of the first change value ΔRPMc1 and the second change value ΔRPMc2 to the upper limit rotation speed change rate ΔRPML. As described above, the output from the second adder 152 is the rotation speed change rate ΔRPM determined by the rotation speed change rate setting unit 140. Therefore, at time t0, the rotation speed change rate ΔRPM determined by the rotation speed change rate setting unit 140 has a greater value than the upper limit rotation speed change rate ΔRPML.

In the actuation step, the clearance amount CL gradually decreases with the lapse of time. Therefore, the first change value ΔRPMc1 and the second change value ΔRPMc2 which relate to the rotation speed change rate ΔRPM also gradually decrease with the lapse of time in the actuation step. However, in a case where the clearance amount CL is larger than the allowable minimum clearance amount CLmin, the first change value ΔRPMc1 and the second change value ΔRPMc2 are positive values. Accordingly, even after time to, in a case where the clearance amount CL is larger than the allowable minimum clearance amount CLmin, the rotation speed change rate ΔRPM determined by the rotation speed change rate setting unit 140 has a greater value than the upper limit rotation speed change rate ΔRPML in the actuation step.

When the change rate is not controlled, the rotation speed change rate ΔRPM determined by the rotation speed change rate setting unit 140 is the upper limit rotation speed change rate ΔRPML as described above. Therefore, when the change rate is controlled, until the clearance amount CL has a small value close to the allowable minimum clearance amount CLmin from time t0, the rotation speed change rate ΔRPM is larger than that when the change rate is not controlled.

Therefore, according to the present embodiment, when the change rate is not controlled, the rotation speed RPM is the rated rotation speed at time t1 before time t2 at which the rotation speed RPM is the rated rotation speed. That is, according to the present embodiment, a time from the actuation start of the gas turbine 1 (t0) until the rotation speed RPM of the gas turbine 1 is the rated rotation speed can be shortened.

In this way, according to the present embodiment, the time from the actuation start of the gas turbine 1 (t0) until the rotation speed RPM of the gas turbine 1 is the rated rotation speed is shortened. Accordingly, in the actuation step, the time until the clearance amount CL is the pinch point is also shortened, compared to the time when the change rate is not controlled.

The first change value ΔRPMc1 relating to the rotation speed change rate ΔRPM has a negative value in a case where the clearance amount CL is close to the allowable minimum clearance amount CLmin, and in a case where the clearance amount CL is smaller than the allowable minimum clearance amount CLmin. In addition, the second change value ΔRPMc2 relating to the rotation speed change rate ΔRPM has a negative value in a case where the clearance amount CL is smaller than the allowable minimum clearance amount CLmin. Therefore, in a case where the clearance amount CL is close to the allowable minimum clearance amount CLmin, and in a case where the clearance amount CL is smaller than the allowable minimum clearance amount CLmin, the rotation speed change rate ΔRPM determined by the rotation speed change rate setting unit 140 has a smaller value than the upper limit rotation speed change rate ΔRPML.

Therefore, according to the present embodiment, if the clearance amount CL is close to the pinch point, the rotation speed change rate ΔRPM is smaller than the rotation speed change rate ΔRPM when the change rate is not controlled. Therefore, according to the present embodiment, the clearance amount CL at the pinch point can be prevented from being smaller than that when the change rate is not controlled.

Figure 12:
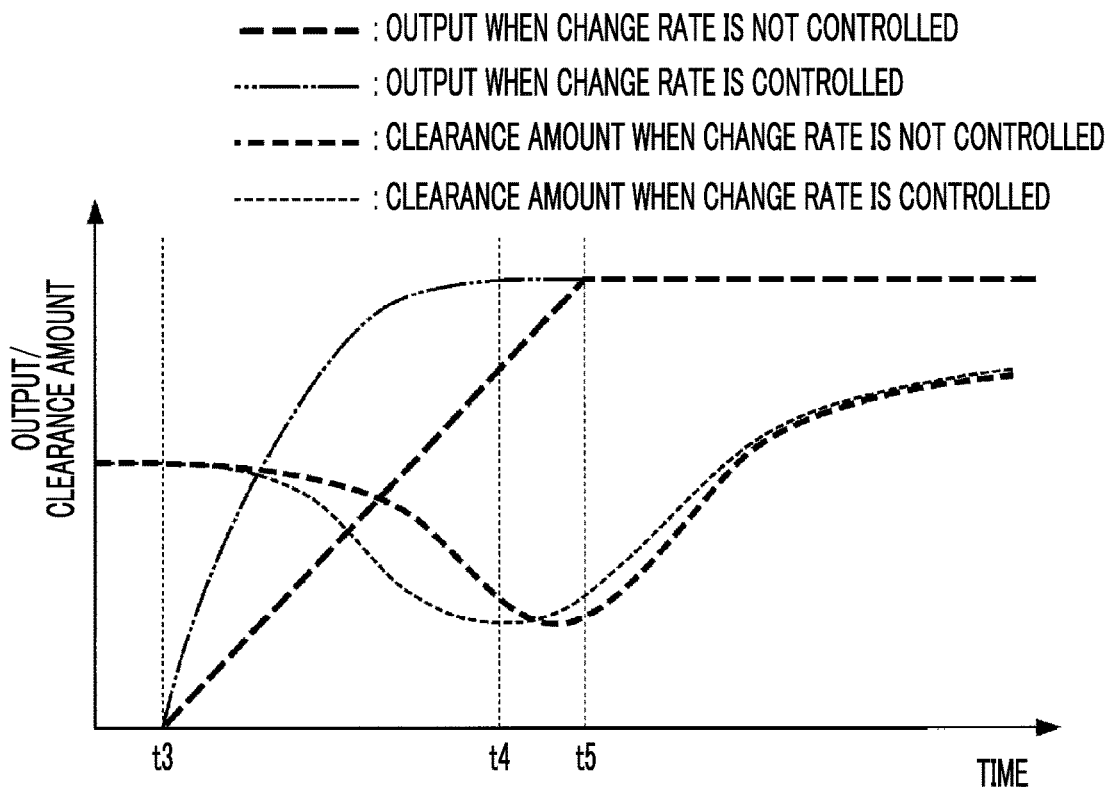
FIG. 12 is a graph illustrating a change in an output and a change in a clearance with the lapse of time in a case where change rate controlling based on a clearance amount is performed in a gas turbine according to a second embodiment of the present invention.

Next, referring to FIG. 12, a change in the output PW and the clearance amount CL when the change rate is controlled based on the above-described clearance amount CL will be described. In the following description, in order to simplify the description, it is assumed that the output value from the second adder 132 of the output change rate setting unit 120 is smaller than the basic output change rate ΔPWb. In this case, the minimum value selector 133 of the change unit 130 selects the output value from the second adder 132, and outputs the output value as the output change rate ΔPW to the output change rate conversion unit 162 of the fuel operation amount output unit 160.

The output PW of the gas turbine 1 gradually increases from time t3 as described above, and if the output PW reaches the required output, the output PW is maintained. The clearance amount CL at time t3 is larger than the clearance amount CL at the pinch point.

The first change value ΔPWc1 and the second change value ΔPWc2 which relate to the output change rate ΔPW increase as the clearance amount CL increases. Moreover, in a case where the clearance amount CL is larger than the allowable minimum clearance amount CLmin, the first change value ΔPWc1 and the second change value ΔPWc2 are positive values. Therefore, the output value from the second adder 132 at time t3 is a value obtained by adding the positive values of the first change value ΔPWc1 and the second change value ΔPWc2 to the upper limit output change rate ΔPWL. As described above, the output from the second adder 132 is the output change rate ΔPW determined by the output change rate setting unit 120. Therefore, at time t3, the output change rate ΔPW determined by the output change rate setting unit 120 has a greater value than the upper limit output change rate ΔPWL.

In a case of increasing the output PW, the clearance amount CL gradually decreases with the lapse of time. Therefore, the first change value ΔPWc1 and the second change value ΔPWc2 which relate to the output change rate ΔPW also gradually decrease as time elapses in the process of increasing the output PW. However, in a case where the clearance amount CL is larger than the allowable minimum clearance amount CLmin, the first change value ΔPWc1 and the second change value ΔPWc2 are positive values.

Accordingly, even in the process of increasing the output PW, in a case where the clearance amount CL is larger than the allowable minimum clearance amount CLmin, the output change rate ΔPW determined by the output change rate setting unit 120 has a greater value than the upper limit output change rate ΔPWL.

When the change rate is not controlled, the output change rate ΔPW determined by the output change rate setting unit 120 is the upper limit output change rate ΔPWL as described above. Therefore, when the change rate is controlled, the output PW becomes the required output at time t4 before time t5 at which the output PW becomes the required output from time t3. That is, according to the present embodiment, it is possible to shorten the time from time t3 until the output PW of the gas turbine 1 becomes the required output.

In this way, according to the present embodiment, the time from the time t3 until the output PW of the gas turbine 1 becomes the required output is shortened. Therefore, in the process of increasing the output PW, the time until the clearance amount CL reaches the pinch point is also shortened compared to the time when the change rate is not controlled.

The clearance amount CL has a negative value in a case where the first change value ΔPWc1 relating to the output change rate ΔPW is close to the allowable minimum clearance amount CLmin, and in a case where the clearance amount CL is smaller than the allowable minimum clearance amount CLmin. The second change value ΔPWc2 relating to the output change rate ΔPW has a negative value in a case where the clearance amount CL is smaller than the allowable minimum clearance amount CLmin. Therefore, in a case where the clearance amount CL is close to the allowable minimum clearance amount CLmin, and in a case where the clearance amount CL is smaller than the allowable minimum clearance amount CLmin, the output change rate ΔPW determined by the output change rate setting unit 120 has a smaller value than the upper limit rotation speed change rate ΔRPML.

Therefore, according to the present embodiment, if the clearance amount CL is close to the pinch point in the process of increasing the output PW, the output change rate ΔPW becomes smaller than the output change rate ΔPW when the change rate is not controlled. Therefore, according to the present embodiment, in the process of increasing the output PW, the clearance amount CL at the pinch point can be prevented from being smaller than that when the change rate is not controlled.

As described above, when the output increases, the clearance amount CL temporarily decreases. On the other hand, when the output decreases, the clearance amount CL temporarily increases. Therefore, according to the present embodiment, even in a case of receiving the load command whose required output is smaller than the current output PW, that is, even in a case of receiving the load command indicating a decrease in the output, when the change rate is controlled, the output PW becomes the required output in a shorter time compared to when the change rate is not controlled.

The change unit 182 of the intake air operation amount setting unit 180 changes the IGV opening degree (operation amount of the inlet guide vane) in accordance with the clearance amount CL measured by the clearance measuring instrument 101. The intake air operation amount output unit 189 outputs the changed IGV opening degree to the driver 23 of the IGV 21. As a result, the IGV opening degree becomes the changed IGV opening degree. If the intake air flow rate is increased without changing the fuel flow rate, the temperature of the combustion gas flowing in the combustion gas flow path 49 is lowered, and the clearance amount CL is changed. As described above, according to the present embodiment, the IGV opening degree is changed in accordance with the clearance amount CL. Therefore, the clearance amount CL can be prevented from being extremely smaller.

The compressed air bled from the intermediate casing 18*b* is cooled by the cooler 62 to become the cooling air Am. The cooling air Am is guided to the first row rotor blade 44*a* via the air bleeding line 61. Then, the cooling air Am is discharged into the combustion gas flow path 49 through the cooling passage 44*c* formed in the first row rotor blade 44*a*. The cooling air Am exchanges heat with the first row rotor blade 44*a* in the process of passing through the cooling passage 44*c* formed in the first row rotor blade 44*a*, thereby cooling the first row rotor blade 44*a*. In addition, if the cooling air Am is discharged from the first row rotor blade 44*a*, a portion of the cooling air Am functions as film cooling air for the first row rotor blade 44*a*. Therefore, according to the present embodiment, the first row rotor blade 44*a* can be prevented from being thermally damaged by the heat of the combustion gas.

Incidentally, if the rotor blade 44 is cooled, the thermal elongation amount of the rotor blade 44 decreases, and the clearance amount CL increases. According to the present embodiment, the change unit 172 of the cooling operation amount setting unit 170 causes the cooling controller 64 to change the flow rate of the cooling medium flowing in the cooler 62 in accordance with the clearance amount CL measured by the clearance measuring instrument 101. As a result, the temperature of the cooling air Am is changed, and the cooling amount of the first row rotor blade 44*a* cooled by the cooling air Am is changed. Therefore, according to the present embodiment, the cooling amount of the first row rotor blade 44*a* is changed in accordance with the clearance amount CL. Accordingly, the clearance amount CL can be prevented from being extremely smaller.

As described above, according to the present embodiment, the rotation speed change rate ΔRPM is changed in accordance with the clearance amount CL. Therefore, the actuation time until the rotation speed RPM reaches the rated rotation speed can be shortened. Furthermore, according to the present embodiment, the output change rate ΔPW is changed in accordance with the clearance amount CL. Therefore, the time until the output PW becomes the required output can be shortened. In this way, according to the present embodiment, the time until the rotation speed RPM becomes the rated rotation speed and the time until the output PW becomes the required output can be shortened. Moreover, the rotation speed change rate ΔRPM and the output change rate ΔPW are changed in accordance with the clearance amount CL. Therefore, the clearance amount CL can be prevented from being extremely smaller. In addition, according to the present embodiment, the opening degree of the IGV21 and the cooling amount of the compressed air are changed in accordance with the clearance amount CL. Therefore, from this point of view, the clearance amount CL can be prevented from being extremely smaller.

Therefore, according to the present embodiment, the output PW and the rotation speed RPM of the gas turbine 1 can have a target value in a short time while damage to the gas turbine 1 is prevented.

In the gas turbine 1, as described above, in a case where the rotation speed RPM or the output PW increases, the clearance amount CL temporarily decreases. In a case where the rotation speed RPM or the output PW decreases, the clearance amount CL temporarily increases. Therefore, only in a case where the rotation speed RPM or the output PW increases, the change rate of the rotation speed RPM or the output PW may be controlled based on the clearance amount CL. In a case where the rotation speed RPM or the output PW decreases, the change rate of the rotation speed RPM or the output PW may be set to have a fixed value.

Second Embodiment

Hereinafter, a second embodiment of rotating machine equipment according to the present invention will be described with reference to FIGS. 13 and 14.

Figure 13:
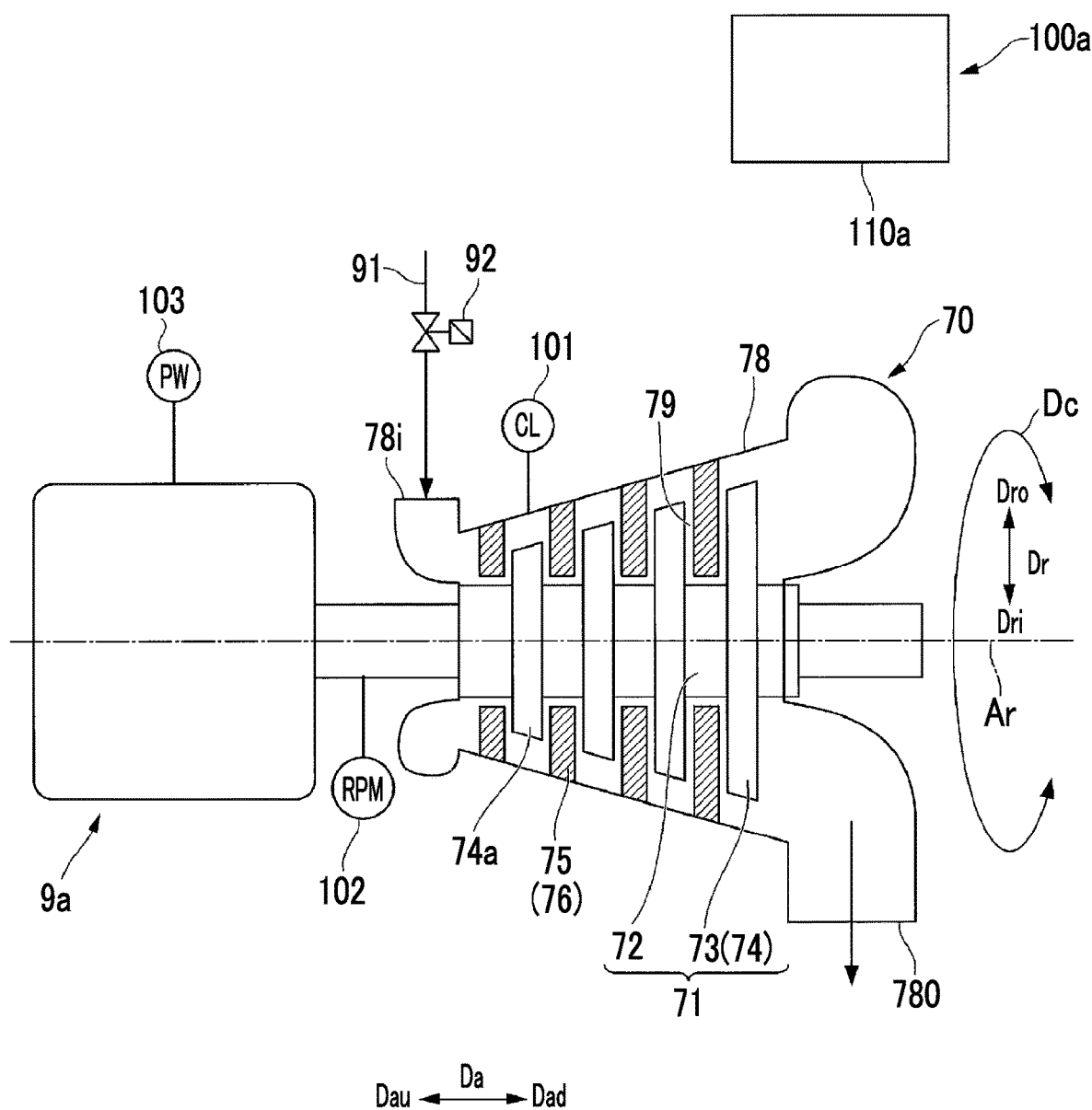
FIG. 13 is a conceptual diagram illustrating a configuration of a steam turbine power generation plant according to the second embodiment of the present invention.

The rotating machine equipment according to the present embodiment is a steam turbine power generation plant as illustrated in FIG. 13. The steam turbine power generation plant includes a steam turbine 70, a generator 9a that generates power by driving the steam turbine 70, and a control device 100a.

The steam turbine 70 has a steam turbine rotor 71 that rotates around the axis Ar, a steam turbine casing 78 that covers the steam turbine rotor 71, and a plurality of stator blade rows 75. The steam turbine rotor 71 has a rotor shaft 72 extending in the axial direction Da around the axis Ar, and a plurality of rotor blade rows 73 attached to the rotor shaft 72. The plurality of rotor blade rows 73 are aligned with each other in the axial direction Da. The respective rotor blade rows 73 are all configured to include a plurality of rotor blades 74 aligned with each other in the circumferential direction Dc. The stator blade row 75 is located on each axial upstream side Dau of the plurality of rotor blade rows 73. The respective stator blade rows 75 are disposed inside the steam turbine casing 78. The respective stator blade rows 75 are all configured to include a plurality of stator blades 76 aligned with each other in the circumferential direction Dc. A space between the outer peripheral side of the rotor shaft 72 and the inner peripheral side of the steam turbine casing 78, that is, an annular space in a region where the stator blade row and the rotor blade row 73 are located in the axial direction Da forms a steam main flow path 79 in which the steam flows. In the following description, out of the plurality of rotor blade rows 73, the rotor blade row 73 most upstream on the axial side Dau will be referred to as a first rotor blade row, and the rotor blade rows 73 toward the axial downstream side Dad will be referred to as a second rotor blade row, a third rotor blade row, and so forth.

According to the present embodiment, the steam turbine 70 having the steam turbine rotor 71 and the steam turbine casing 78 forms an axial flow type rotating machine. A rotor of the generator 9a is connected to the steam turbine rotor 71.

In the steam turbine casing 78, a steam inlet 78i is formed in a portion on its own axial upstream side Dau, and a steam outlet 78o is formed in a portion on its own axial downstream side Dad. A main steam line 91 is connected to the steam inlet 78i. The main steam line 91 has a steam control valve 92 for controlling the flow rate of the steam flowing into the steam turbine casing 78.

The control device 100a has the steam control valve 92, a clearance measuring instrument 101, a rotation speed meter 102, an output meter 103, and a control device body 110a. The clearance measuring instrument 101 measures the clearance amount CL between the steam turbine casing 78 and the steam turbine rotor 71. The rotation speed meter 102 measures the rotation speed RPM of the steam turbine rotor 71. The output meter 103 measures the output PW of the steam turbine 70, in other words, the power generation amount of the generator 9a. Both the rotation speed meter 102 and the output meter 103 are examples of parameter meters.

There is a clearance between the rotor blade 74 of the steam turbine rotor 71 that rotates around the axis Ar and the steam turbine casing 78 that covers the steam turbine rotor 71. The clearance measuring instrument 101 according to the present embodiment measures the clearance amount CL between the first row rotor blade 74a and the steam turbine casing 78. The control device 100a according to the present embodiment includes the plurality of clearance measuring instruments 101, as in the control device 100a according to the first embodiment. The clearance measuring instrument 101 may measure the clearance amount between the second row rotor blade 74 and the steam turbine casing 78. Furthermore, the clearance measuring instrument 101 may measure the clearance amount between the first row rotor blade 74a and the steam turbine casing 78 and the clearance amount between the second row rotor blade 74 and the steam turbine casing 78.

Figure 14:
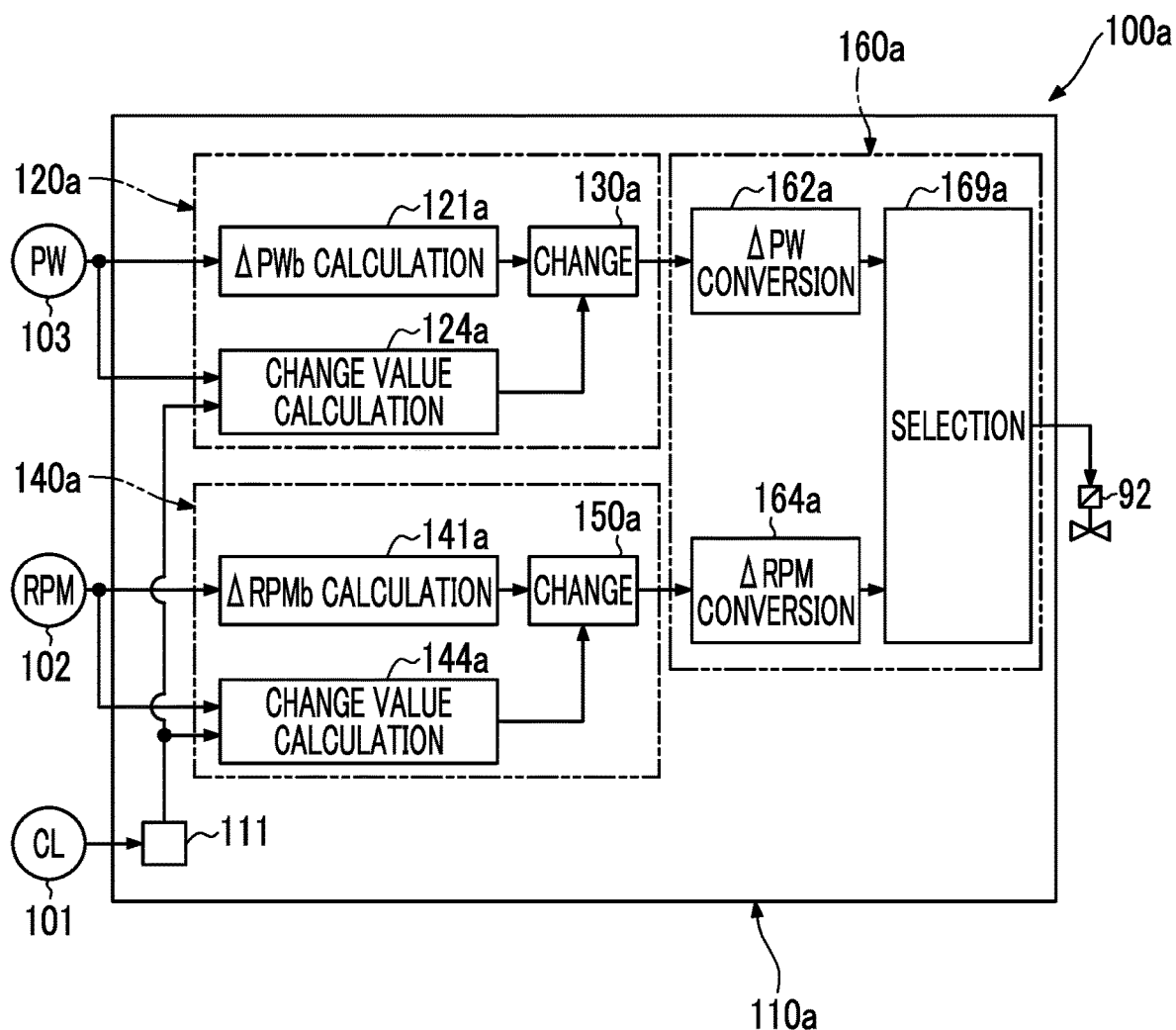
FIG. 14 is a functional block diagram illustrating a configuration of a control device according to the second embodiment of the present invention.

As illustrated in FIG. 14, the control device body 110a has a clearance signal processing unit 111, an output change rate setting unit 120a, a rotation speed change rate setting unit 140a, and a steam operation amount output unit 160a. The control device body 110a is also a computer, as in the control device body 110 according to the first embodiment. Each functional configuration of the control device body 110a is realized by the CPU of the computer executing a control program stored in the computer.

The clearance signal processing unit 111 processes signals output from the plurality of clearance measuring instruments 101, and outputs the minimum clearance amount CL out of the clearance amounts CL measured by the plurality of clearance measuring instruments 101.

As in the output change rate setting unit 120 according to the first embodiment, the output change rate setting unit 120a has a basic output change rate calculation unit 121a, a change value calculation unit 124a, and a change unit 130a.

The basic output change rate calculation unit 121a basically has the same configuration as the basic output change rate calculation unit 121 according to the first embodiment, and obtains the basic output change rate ΔPWb, based on a deviation between the target output PWt determined in accordance with the load command or the actuation command and the output PW measured by the output meter 103.

The change value calculation unit 124a basically has the same configuration as the change value calculation unit 124 according to the first embodiment. Therefore, although not illustrated, as in the change value calculation unit 124, the change value calculation unit 124a has the upper limit output change rate calculation unit, the first change value calculation unit, and the second change value calculation unit. The upper limit output change rate calculation unit uses the map indicating the relationship between the actual output PW and the upper limit output change rate ΔPW which is the upper limit of the output change rate ΔPW so as to obtain the upper limit output change rate ΔPWL corresponding to the output PW measured by the output meter 103. The first change value calculation unit of the change value calculation unit 124a uses the map indicating the relationship between the clearance amount CL and the first change value ΔPWc1 for changing the basic output change rate ΔPWb so as to obtain the first change value ΔPWc1 corresponding to the clearance amount CL output from the clearance signal processing unit 111. As in the map 126m belonging to the first change value calculation unit 126 according to the first embodiment, the relationship indicated by the map is basically a relationship in which the first change value ΔPWc1 increases as the clearance amount CL increases. Furthermore, in this map, in a case where the clearance amount CL is larger than the allowable minimum clearance amount CLmin, the first change value ΔPWc1 indicates a positive value. In a case where the clearance amount CL is smaller than the allowable minimum clearance amount CLmin, the first change value ΔPWc1 indicates a negative value. Although not illustrated, as in the second change value calculation unit 127 according to the first embodiment, the second change value calculation unit of the change value calculation unit 124a has the allowable minimum value storage unit and the ΔPI calculation unit. The allowable minimum value storage unit stores the allowable minimum clearance amount CLmin. The ΔPI calculation unit obtains the deviation between the allowable minimum clearance amount CLmin and the clearance amount CL output from the clearance signal processing unit 111, and obtains the second change value ΔPWc2 which is the proportional and integral controlled variable (PI controlled variable) corresponding to the deviation. Therefore, the second change value ΔPWc2 obtained by the second change value calculation unit increases as the deviation increases between the allowable minimum clearance amount CLmin and the clearance amount CL.

The change unit 130a basically has the same configuration as the change units 130, 150, 172, and 182 according to the first embodiment. Therefore, although not illustrated, as in the change unit 130 according to the first embodiment, the change unit 130a has the first adder, the second adder, and the minimum value selector. The first adder is operated similarly to the first adder 131 according to the first embodiment. The second adder is operated similarly to the second adder 132 according to the first embodiment. The minimum value selector is operated similarly to the minimum value selector 133 according to the first embodiment.

The steam operation amount output unit 160a has an output change rate conversion unit 162a, a rotation speed change rate conversion unit 164a, and a selection unit 169a. The output change rate conversion unit 162a converts the output change rate ΔPW set by the output change rate setting unit 120a into the operation amount of the steam control valve 92 which is the operation terminal. The rotation speed change rate conversion unit 164a converts the rotation speed change rate ΔRPM set by the rotation speed change rate setting unit 140a into the operation amount of the steam control valve 92 which is the operation terminal. The selection unit 169a outputs only one operation amount out of the operation amount obtained by the output change rate conversion unit 162a and the operation amount obtained by the rotation speed change rate conversion unit 164a, to the steam control valve 92.

As in the rotation speed change rate setting unit 140 according to the first embodiment, the rotation speed change rate setting unit 140a has a basic rotation speed change rate calculation unit 141a, a change value calculation unit 144a, and a change unit 150a.

The basic rotation speed change rate calculation unit 141a basically has the same configuration as the basic rotation speed change rate calculation unit 141 according to the first embodiment, and obtains the basic rotation speed change rate ΔRPMb, based on the deviation between the target rotation speed RPMt determined in accordance with the actuation command and the rotation speed RPM measured by the rotation speed meter 102.

The change value calculation unit 144a basically has the same configuration as the change value calculation unit 144 according to the first embodiment. Therefore, although not illustrated, as in the change value calculation unit 144 according to the first embodiment, the change value calculation unit 144a also has the upper limit rotation speed change rate calculation unit, the first change value calculation unit, and the second change value calculation unit. The upper limit rotation speed change rate calculation unit uses the map indicating the relationship between the actual rotation speed RPM and the upper limit rotation speed change rate ΔRPML which is the upper limit value of the rotation speed change rate ΔRPM so as to obtain the upper limit rotation speed change rate ΔRPML corresponding to the rotation speed RPM measured by the rotation speed meter 102. The first change value calculation unit of the change value calculation unit 144a uses the map indicating the relationship between the clearance amount CL and the first change value ΔRPMc1 for changing the basic rotation speed change rate ΔRPMb so as to obtain the first change value ΔRPMc1 corresponding to the clearance amount CL output from the clearance signal processing unit 111. As in the map 146m belonging to the first change value calculation unit 146 according to the first embodiment, the relationship indicated by the map is basically a relationship in which the first change value ΔRPMc1 increases as the clearance amount CL increases. Furthermore, in the map, in a case where the clearance amount CL is larger than the allowable minimum clearance amount CLmin, the first change value ΔRPMc1 indicates a positive value. In a case where the clearance amount CL is smaller than the allowable minimum clearance amount CLmin, the first change value ΔRPMc1 indicates a negative value. Although not illustrated, as in the second change value calculation unit 147 according to the first embodiment, the second change value calculation unit 144a of the change value calculation unit 144a has the allowable minimum value storage unit and the ΔPI calculation unit. The allowable minimum value storage unit stores the allowable minimum clearance amount CLmin. The ΔPI calculation unit obtains the deviation between the allowable minimum clearance amount CLmin and the clearance amount CL output from the clearance signal processing unit 111, and obtains the second change value ΔRPMc2 which is the proportional and integral controlled variable (PI controlled variable) corresponding to the deviation. Therefore, the second change value ΔRPMc2 obtained by the second change value calculation unit increases as the deviation increases between the allowable minimum clearance amount CLmin and the clearance amount CL.

The change unit 150a basically has the same configuration as the change unit 150 according to the first embodiment. Therefore, although not illustrated, as in the change unit 150 according to the first embodiment, the change unit 150a has the first adder, the second adder, and the minimum value selector. The first adder is operated similarly to the first adder 151 according to the first embodiment. The second adder is operated similarly to the second adder 152 according to the first embodiment. The minimum value selector is operated similarly to the minimum value selector 153 according to the first embodiment.

According to the gas turbine 1 described in the first embodiment, in a case where the rotation speed RPM or the output PW increases, the clearance amount CL temporarily decreases, and in a case where the rotation speed RPM or the output PW decreases, the clearance amount CL temporarily increases. On the other hand, according to the steam turbine 70, due to the relationship between the heat capacity of the steam turbine casing 78 and the heat capacity of the rotor blade 74, the clearance amount CL temporarily increases in a case where the rotation speed RPM or the output PW increases, and the clearance amount CL temporarily decreases in a case where the rotation speed RPM or the output PW decreases. That is, change tendencies of the clearance amount CL with respect to an increase or a decrease in the rotation speed RPM or the output PW are opposite to each other between the gas turbine 1 and the steam turbine 70.

However, according to the present embodiment, as in the first embodiment, when the clearance amount CL decreases, the rotation speed change rate ΔRPM and the output change rate ΔPW decrease, and when the clearance amount CL increases, the rotation speed change rate ΔRPM and the output change rate ΔPW increase. Therefore, according to the present embodiment, as in the first embodiment, the actuation time until the rotation speed RPM reaches the rated rotation speed can be shortened. Furthermore, according to the present embodiment, the time until the output PW reaches the required output can be shortened. Moreover, the clearance amount CL can be prevented from being extremely smaller.

According to the steam turbine 70, as described above, in a case where the rotation speed RPM or the output PW decreases, the clearance amount CL temporarily decreases. In a case where the rotation speed RPM or the output PW increases, the clearance amount CL temporarily increases. Therefore, only in a case where the rotation speed RPM or the output PW decreases, the change rate of the rotation speed RPM or the output PW may be controlled based on the clearance amount CL. In a case where the rotation speed RPM or the output PW increases, the change rate of the rotation speed RPM or the output PW may be set to have a fixed value.

Third Embodiment

Hereinafter, a third embodiment of rotating machine equipment according to the present invention will be described with reference to FIGS. 15 and 16.

Figure 15:
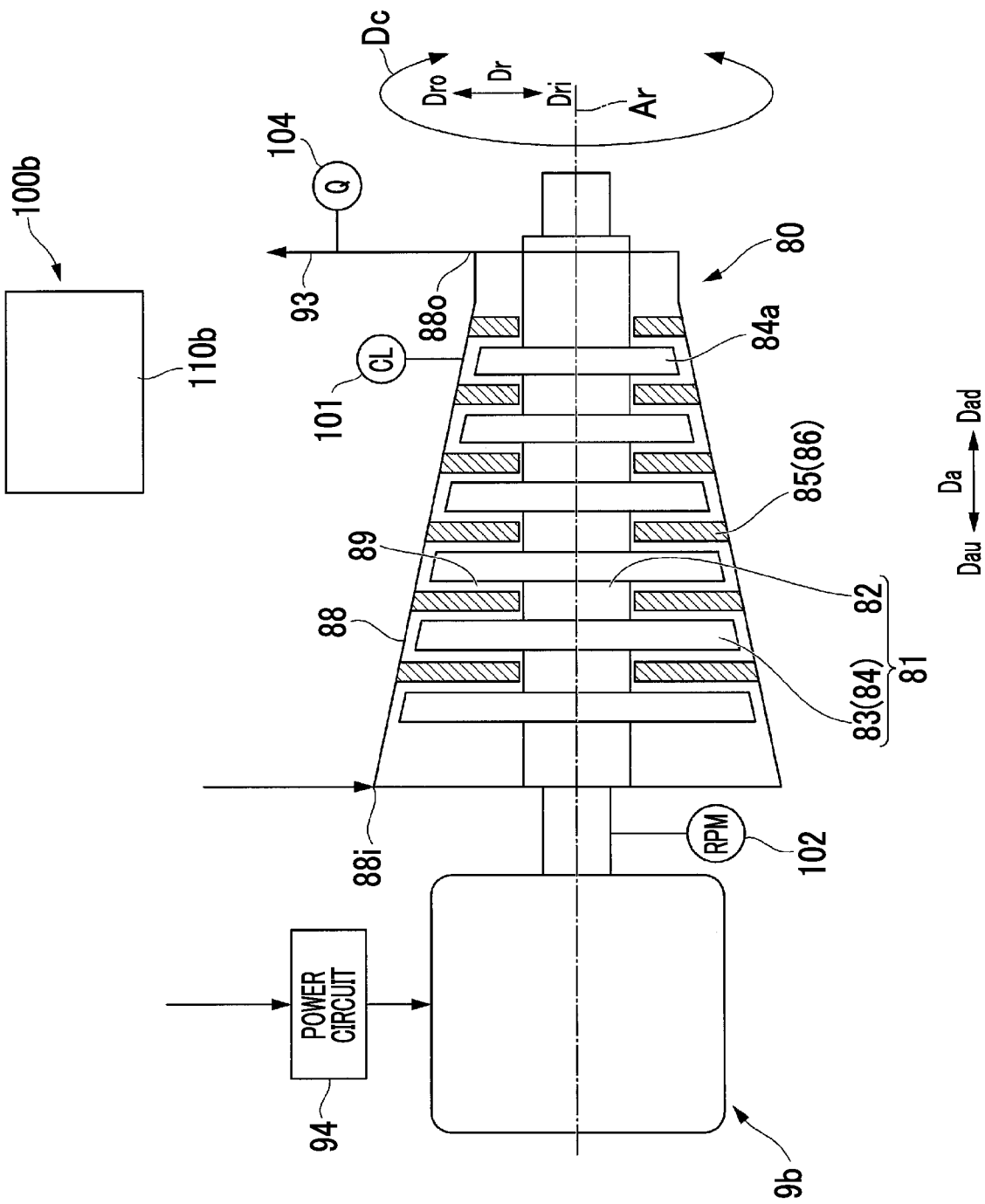
FIG. 15 is a conceptual diagram illustrating a configuration of a gas compression plant according to a third embodiment of the present invention.

The rotating machine equipment according to the present embodiment is a gas compression plant as illustrated in FIG. 15. The gas compression plant includes a compressor 80, a motor 9b that drives the compressor 80, and a control device 100b.

The compressor 80 includes a compressor rotor 81 that rotates around the axis Ar, a compressor casing 88 that covers the compressor rotor 81, and a plurality of stator blade rows 85. The compressor rotor 81 has a rotor shaft 82 extending in the axial direction Da around the axis Ar, and a plurality of rotor blade rows 83 attached to the rotor shaft 82. The plurality of rotor blade rows 83 are aligned with each other in the axial direction Da. The respective rotor blade rows 83 are all configured to include a plurality of rotor blades 84 aligned with each other in the circumferential direction Dc. The stator blade row 85 is located on each axial downstream side Dad of the plurality of rotor blade rows 83. The respective stator blade rows are disposed inside the compressor casing 88. The respective stator blade rows 85 are all configured to include a plurality of stator blades 86 aligned with each other in the circumferential direction Dc. A space between the outer peripheral side of the rotor shaft 82 and the inner peripheral side of the compressor casing 88, that is, an annular space in a region where the stator blade row 85 and the rotor blade row 83 are located in the axial direction Da forms a gas compression flow path 89 in which flowing gas is compressed. That is, the compressor 80 is an axial flow multi-stage compressor. In the following description, out of the plurality of rotor blade rows 83, the rotor blade row 83 most upstream on the axial side Dau will be referred to as a first rotor blade row, and the rotor blade rows 83 toward the axial downstream side Dad will be referred to as a second rotor blade row, a third rotor blade row, and so forth. The rotor blade row 83 most downstream on the axial side Dad will be referred to as a final rotor blade row.

According to the present embodiment, the compressor 80 having the compressor rotor 81 and the compressor casing 88 forms a rotating machine. A rotor of the motor 9b that rotates the compressor rotor 81 is connected to the compressor rotor 81. A power circuit 94 that changes the rotation speed RPM of the rotor of the motor 9b by changing a supply state of the power to be supplied to the motor 9b is connected to the motor 9b.

In the compressor casing 88, a gas inlet 88i is formed in a portion on its own axial upstream side Dau, and a gas outlet 88o is formed in a portion on its own axial downstream side Dad. A compressed gas line 93 is connected to the gas outlet 88o. The compressed gas line 93 has a flowmeter 104 for measuring a flow rate Q of the gas discharged from the compressor 80.

The control device 100b has a power circuit 94, a clearance measuring instrument 101, a rotation speed meter 102, the flowmeter 104, and a control device body 110b. The clearance measuring instrument 101 measures the clearance amount CL between the compressor casing 88 and the compressor rotor 81. The rotation speed meter 102 measures the rotation speed RPM of the compressor rotor 81. The flowmeter 104 measures a discharge flow rate as the output of the compressor 80. Both the rotation speed meter 102 and the flowmeter 104 are examples of the parameter meter.

There is a clearance between the rotor blade 84 of the compressor rotor 81 that rotates around the axis Ar and the compressor casing 88 that covers the compressor rotor 81. The clearance measuring instrument 101 according to the present embodiment measures the clearance amount CL between a final row rotor blade 84a and the compressor casing 88. The control device 100b according to the present embodiment includes the plurality of clearance measuring instruments 101, as in the control devices 100 and 100a according to the first and second embodiments. The clearance measuring instrument 101 may measure the clearance amount CL between the rotor blade 84 located in one preceding row on the axial upstream side Aru from the last row and the compressor casing 88. Furthermore, the clearance measuring instrument 101 may measure the clearance amount CL between the final row rotor blade 84a and the compressor casing 88, and the clearance amount CL between the rotor blade 84 located in one preceding row on the axial upstream side Aru from the last row and the compressor casing 88.

Figure 16:
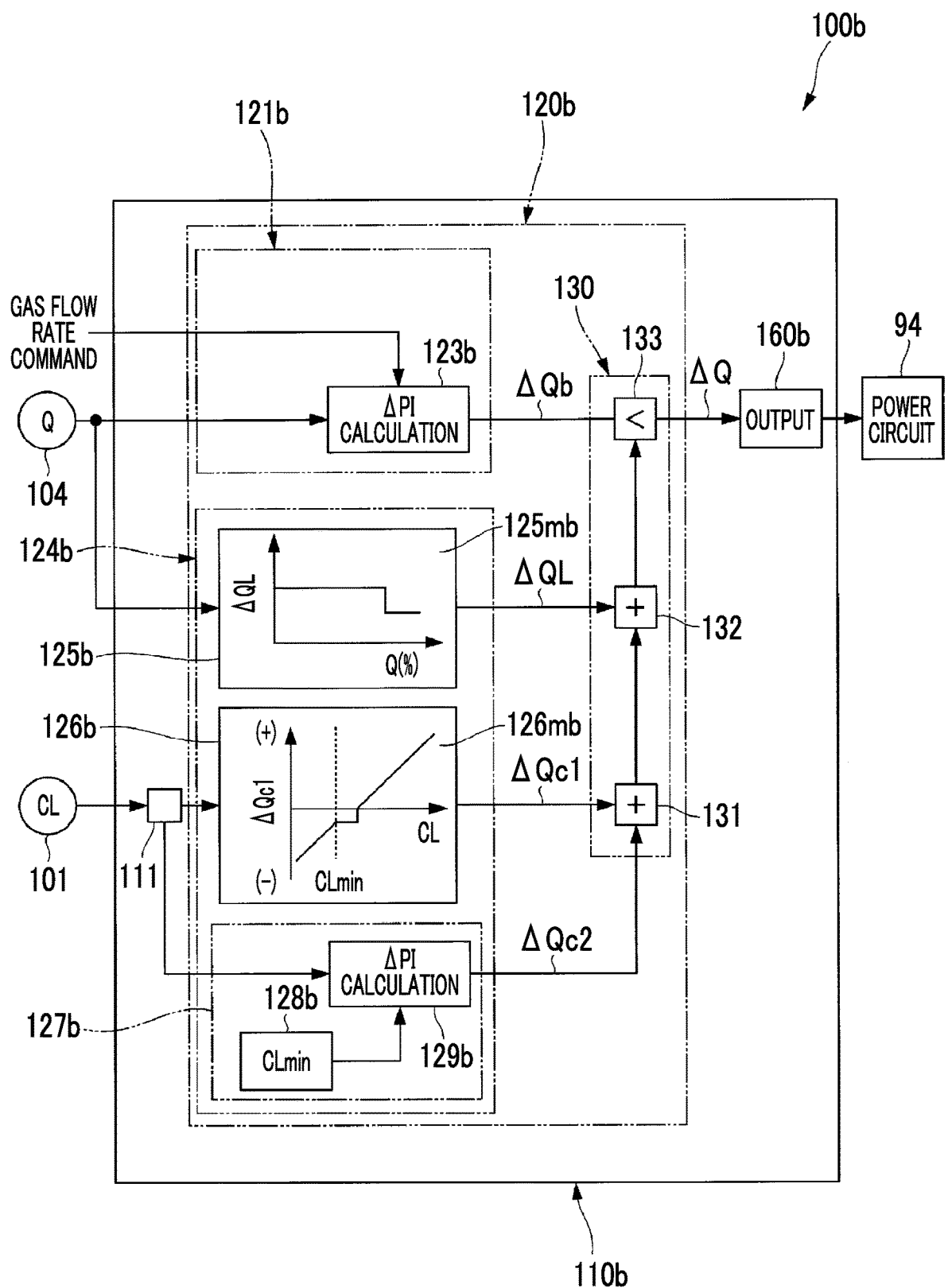
FIG. 16 is a functional block diagram illustrating a configuration of a control device according to the third embodiment of the present invention.

As illustrated in FIG. 16, the control device body 110b has a clearance signal processing unit 111, a flow rate change rate setting unit 120b, and a flow rate operation amount output unit 160b. The control device body 110b is also a computer, as in the control device body 110 according to the first embodiment. Each functional configuration of the control device body 110b is realized by the CPU of the computer executing a control program stored in the computer.

The clearance signal processing unit 111 processes signals output from the plurality of clearance measuring instruments 101, and outputs the minimum clearance amount CL out of the clearance amounts CL measured by the plurality of clearance measuring instruments 101.

The flow rate change rate setting unit 120b has a basic flow rate change rate calculation unit 121b, a change value calculation unit 124b, and a change unit 130.

The basic flow rate change rate calculation unit 121b has a ΔPI calculation unit 123b. The ΔPI calculation unit 123b obtains a basic flow rate change rate ΔQb which is the proportional and integral controlled variable (PI controlled variable) corresponding to the deviation between a required gas flow rate indicated by an external gas flow rate command and a discharge flow rate Q measured by the flowmeter.

The change value calculation unit 124b basically has the same configuration as the change value calculation unit 124 according to the first embodiment. Therefore, as in the change value calculation unit 124 of the first embodiment, the change value calculation unit 124b has an upper limit flow rate change rate calculation unit 125b, a first change value calculation unit 126b, and a second change value calculation unit 127b. The upper limit flow rate change rate calculation unit 125b has a map 125mb indicating a relationship between the actual upper discharge flow rate Q and an upper limit flow rate change rate ΔQL which is the upper limit value of the flow rate change rate. The upper limit flow rate change rate calculation unit 125b uses the map 125mb so as to obtain the upper limit flow rate change rate ΔQL corresponding to the discharge flow rate Q measured by the flowmeter 104. The first change value calculation unit 126b has a map 126mb indicating a relationship between the clearance amount CL and a first change value ΔQc1 for changing a basic flow rate change rate ΔQb. The first change value calculation unit 126b uses the map 126mb so as to obtain the first change value ΔQc1 corresponding to the clearance amount CL output from the clearance signal processing unit 111. As in the map 126m belonging to the first change value calculation unit 126 according to the first embodiment, the relationship indicated by the map 126mb is basically a relationship in which the first change value ΔQc1 increases as the clearance amount CL increases. Furthermore, in the map 126m, in a case where the clearance amount CL is larger than the allowable minimum clearance amount CLmin, the first change value ΔQc1 indicates a positive value. In a case where the clearance amount CL is smaller than the allowable minimum clearance amount CLmin, the first change value ΔQc1 indicates a negative value. The second change value calculation unit 127b has an allowable minimum value storage unit 128b and a ΔPI calculation unit 129b. The allowable minimum value storage unit 128b stores the allowable minimum clearance amount CLmin. The ΔPI calculation unit 129b obtains the deviation between the allowable minimum clearance amount CLmin and the clearance amount CL output from the clearance signal processing unit 111, and obtains a second change value ΔQc2 which is the proportional and integral controlled variable (PI controlled variable) corresponding to the deviation. Therefore, the second change value ΔQc2 obtained by the second change value calculation units 127 and 147 increases as the deviation increases between the allowable minimum clearance amount CLmin and the clearance amount CL.

The change unit 130 basically has the same configuration as the change unit 130 according to the first embodiment. Therefore, as in the change unit 130 according to the first embodiment, the change unit 130 has the first adder 131, the second adder 132, and the minimum value selector 133. The first adder 131 is operated similarly to the first adder 131 according to the first embodiment. The second adder 132 is operated similarly to the second adder 132 according to the first embodiment. The minimum value selector 133 is operated similarly to the minimum value selector 133 according to the first embodiment.

The flow rate operation amount output unit 160b converts the flow rate change rate ΔQ set by the flow rate change rate setting unit 120b into the operation amount of the power circuit 94 which is the operation terminal. Then, the flow rate operation amount output unit 160b outputs the operation amount to the power circuit 94. As a result, the rotation speed RPM of the motor rotor is changed. The rotation speed RPM of the compressor rotor 81 is changed together with the change in the rotation speed RPM of the motor rotor, and the discharge flow rate Q reaches the required gas flow rate indicated by the gas flow rate command.

According to the gas turbine 1 described in the first embodiment, in a case where the rotation speed RPM or the output PW increases, the clearance amount CL temporarily decreases, and in a case where the rotation speed RPM or the output PW decreases, the clearance amount CL temporarily increases. On the other hand, according to the compressor 80, generally due to the relationship between the heat capacity of the compressor casing 88 and the heat capacity of the rotor blade 84, as in the steam turbine 70, the clearance amount CL temporarily increases in a case where the discharge flow rate Q or the rotation speed RPM increases, and the clearance amount CL temporarily decreases in a case where the discharge flow rate Q or the rotation speed RPM decreases. That is, change tendencies of the clearance with respect to an increase or a decrease in the discharge flow rate Q or the rotation speed RPM are opposite to each other between the gas turbine 1 and the compressor 80, and are the same as each other between the steam turbine 70 and the compressor 80.

However, according to the present embodiment, as in the first embodiment, when the clearance amount CL decreases, the flow rate change rate ΔQ decreases, and when the clearance amount CL increases, the flow rate change rate ΔQ increases. Therefore, according to the present embodiment, the time until the actual discharge flow rate Q reaches the required flow rate can be shortened, and the clearance amount CL can be prevented from being extremely smaller.

In the above description, the discharge flow rate Q as the output of the compressor 80 is treated as the parameter of the compressor 80. However, alternatively, the discharge pressure as the output of the compressor 80 may be treated as the parameter of the compressor 80. In this case, the basic pressure change rate which is the proportional and integral controlled variable (PI controlled variable) corresponding to the deviation between the required gas pressure indicated by the external gas pressure command and a discharge pressure measured by a pressure gauge is obtained. Then, the basic pressure change rate is changed using the first change value and the second change value based on the upper limit pressure change rate and the clearance amount CL. In addition, the rotation speed RPM of the compressor 80 may be treated as the parameter of the compressor 80. In this case, the basic rotation speed change rate which is the proportional and integral controlled variable (PI controlled variable) corresponding to the deviation between the required rotation speed indicated by the external rotation speed command and the rotation speed RPM measured by the rotation speed meter 102 is obtained. Then, the basic rotation speed change rate is changed using the first change value and the second change value based on the upper limit rotation speed change rate and the clearance amount.

According to the compressor 80, as described above, in a case where the discharge flow rate Q or the rotation speed RPM decreases, the clearance amount CL temporarily decreases. In a case where the discharge flow rate Q or the rotation speed RPM increases, the clearance amount CL temporarily increases. Therefore, only in a case where the discharge flow rate Q or the rotation speed RPM decreases, the change rate of the discharge flow rate Q or the rotation speed RPM may be controlled based on the clearance amount CL. In a case where the discharge flow rate Q or the rotation speed RPM increases, the change rate of the discharge flow rate Q or the rotation speed RPM may be set to have a fixed value.

In addition, as described in the first, second, and third embodiments, as long as the rotating machine has the rotating rotor and the casing that covers the outer peripheral side of the rotor, even when the other rotating machine is adopted, the change rate of the rotation speed or the discharge flow rate as the output may be controlled to be changed based on the clearance in the same manner as those according to the above-described embodiments.

Fourth Embodiment

Hereinafter, a fourth embodiment of rotating machine equipment according to the present invention will be described with reference to FIGS. 17 and 18.

Figure 17:
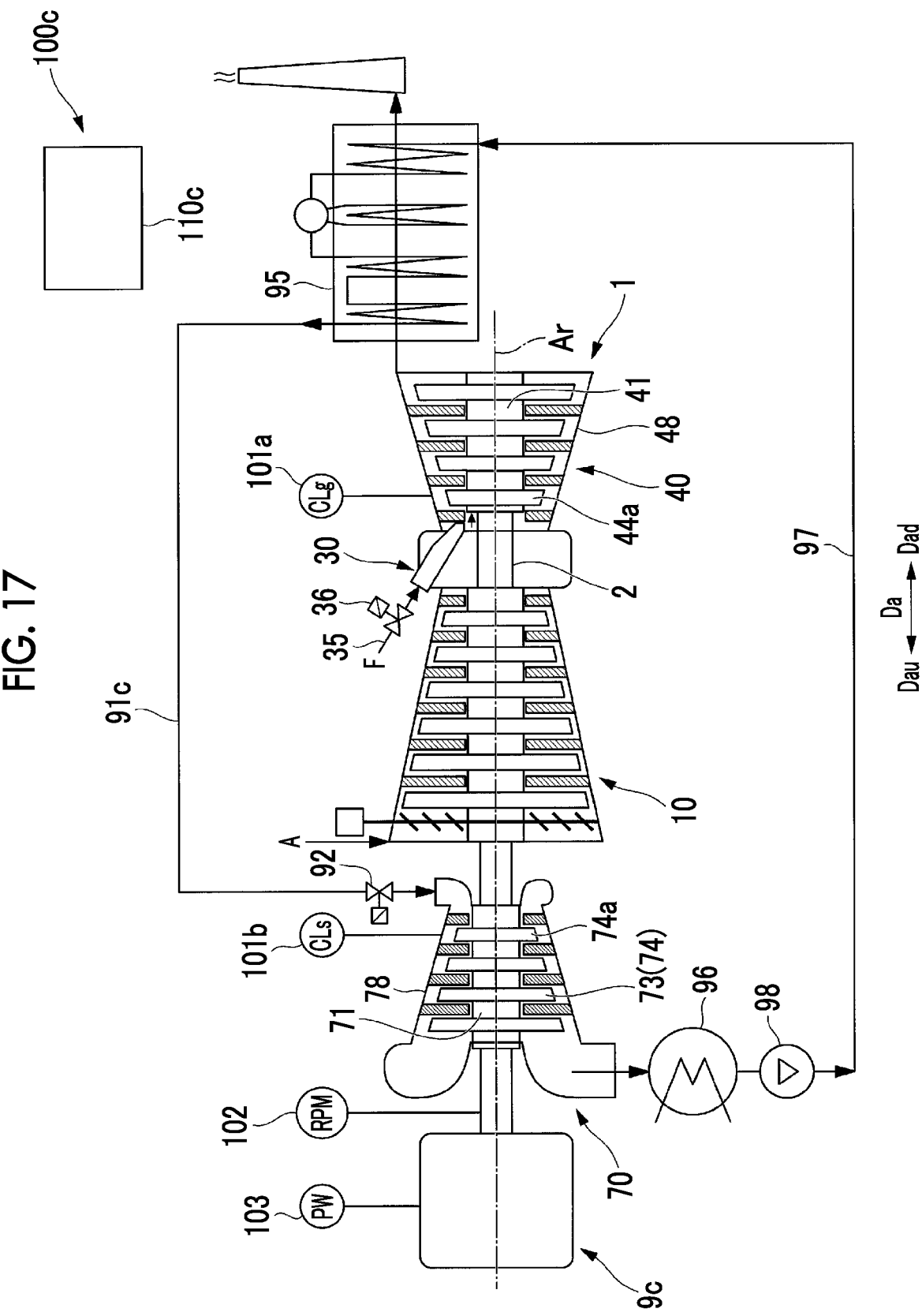
FIG. 17 is a conceptual diagram illustrating a configuration of a combined cycle plant according to a fourth embodiment of the present invention.
Figure 18:
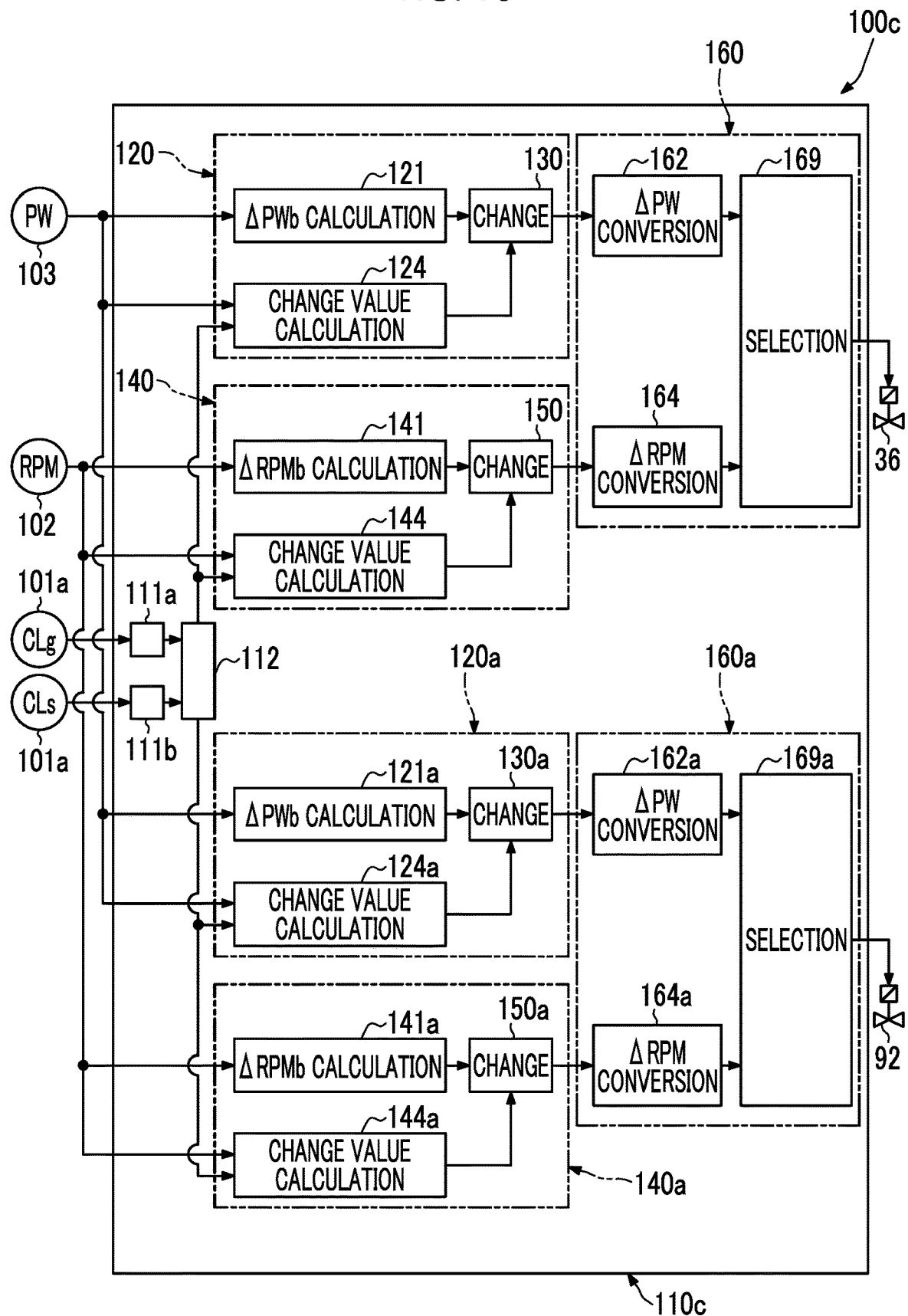
FIG. 18 is a functional block diagram illustrating a configuration of a control device according to the fourth embodiment of the present invention.

The rotating machine equipment according to the present embodiment is a so-called combined cycle plant as illustrated in FIG. 17. The combined cycle plant includes the gas turbine 1, the steam turbine 70, a generator 9c, a heat recovery system generator 95, a main steam line 91c, a condenser 96, a water supply line 97, a water supply pump 98, and a control device 100c.

The gas turbine 1 is the gas turbine 1 having the same configuration as the gas turbine 1 according to the first embodiment. Therefore, the gas turbine 1 includes the compressor 10 that compresses the air A, the combustor 30 that generates the combustion gas by combusting the fuel F in the air compressed by the compressor 10, and the turbine 40 driven by using the combustion gas. The fuel line 35 through which the fuel F flows is connected to the combustor 30. The fuel control valve 36 has the fuel line 35. The turbine casing 48 has a gas turbine clearance measuring instrument 101a for measuring a clearance amount CLg between the turbine casing 48 and the first row rotor blade 44a.

The steam turbine 70 is a steam turbine having the same configuration as the steam turbine 70 according to the second embodiment. The steam turbine casing 78 has a steam turbine clearance measuring instrument 101b for measuring a clearance amount CLs between the steam turbine casing 78 and the first row rotor blade 74a.

The generator 9c generates power by driving the gas turbine 1 and the steam turbine 70. The gas turbine rotor 2, the steam turbine rotor 71, and the rotor of the generator 9c are connected to each other, and integrally rotate around the same axis Ar. Therefore, the combined cycle plant according to the present embodiment is a single-axis type combined cycle plant.

The heat recovery system generator 95 uses the heat of the exhaust gas exhausted from the gas turbine 1 so as to convert the water into the steam. The main steam line 91c guides the steam generated by the heat recovery system generator 95 to the steam turbine 70. The main steam line 91c is provided with the steam control valve 92 for controlling the flow rate of the steam flowing into the steam turbine 70. The condenser 96 cools the steam exhausted from the steam turbine 70 so as to return the steam to the water. The water supply line 97 guides the water inside the condenser 96 to the heat recovery system generator 95. The water supply pump 98 feeds the water in the water supply line 97 to the condenser 96.

The control device 100c has the fuel control valve 36, the steam control valve 92, the gas turbine clearance measuring instrument 101a, the steam turbine clearance measuring instrument 101b, a rotation speed meter 102, an output meter 103, and a control device body 110c. The rotation speed meter 102 measures any rotation speed RPM of the gas turbine rotor 2, the steam turbine rotor 71, and the rotor of the generator 9c. The output meter 103 detects the power generation amount of the generator 9c. According to the present embodiment, the rotation speed RPM measured by the rotation speed meter 102 is the parameter relating to the gas turbine 1, and is also the parameter relating to the steam turbine 70. The output PW measured by the output meter 103 is the parameter relating to the gas turbine 1, and is also the parameter relating to the steam turbine 70.

As illustrated in FIG. 17, the control device body 110c has a first clearance signal processing unit 111a, a second clearance signal processing unit 111b, a clearance selection output unit 112, a gas turbine output change rate setting unit 120, a gas turbine rotation speed change rate setting unit 140, a fuel operation amount output unit 160, a steam turbine output change rate setting unit 120a, a steam turbine rotation speed change rate setting unit 140a, and a steam operation amount output unit 160a. The control device body 110c is also a computer, as in the control device body 110 according to the first embodiment. Each functional configuration of the control device body 110c is realized by the CPU of the computer executing a control program stored in the computer.

The first clearance signal processing unit 111a processes signals output from the plurality of gas turbine clearance measuring instruments 101a, and outputs a minimum clearance amount CLg out of the clearance amounts CLg measured by the plurality of gas turbine clearance measuring instruments 101a. Hereinafter, the clearance amount CLg output from the first clearance signal processing unit 111a will be referred to as the gas turbine clearance amount CLg. The second clearance signal processing unit 111b processes signals output from the plurality of steam turbine clearance measuring instruments 101b, and outputs a minimum clearance amount CLs out of the clearance amounts CLs measured by the plurality of steam turbine clearance measuring instruments 101b. Hereinafter, the clearance amount CLs output from the second clearance signal processing unit 111b will be referred to as the steam turbine clearance amount CLs.

The clearance selection output unit 112 outputs the gas turbine clearance amount CLg output from the first clearance signal processing unit 111a when the output PW increases, and outputs the steam turbine clearance amount CLs output from the second clearance signal processing unit 111b when the output PW decreases.

The gas turbine output change rate setting unit 120 is the same as the output change rate setting unit 120 according to the first embodiment. Therefore, as in the output change rate setting unit 120 according to the first embodiment, the gas turbine output change rate setting unit 120 according to the present embodiment also has the basic output change rate calculation unit 121, the change value calculation unit 124, and the change unit 130. The gas turbine rotation speed change rate setting unit 140 is the same as the rotation speed change rate setting unit 140 according to the first embodiment. Therefore, as in the rotation speed change rate setting unit 140 according to the first embodiment, the gas turbine rotation speed change rate setting unit 140 according to the present embodiment also has the basic rotation speed change rate calculation unit 141, the change value calculation unit 144, and the change unit 150. The fuel operation amount output unit 160 is the same as the fuel operation amount output unit 160 according to the first embodiment. Therefore, as in the fuel operation amount output unit 160 according to the first embodiment, the fuel operation amount output unit 160 according to the present embodiment also has the output change rate conversion unit 162, the rotation speed change rate conversion unit 164, and the selection unit 169.

The steam turbine output change rate setting unit 120a is the same as the output change rate setting unit 120a according to the second embodiment. Therefore, as in the output change rate setting unit 120a according to the second embodiment, the steam turbine output change rate setting unit 120a according to the present embodiment also has the basic output change rate calculation unit 121a, the change value calculation unit 124a, and the change unit 130a. The steam turbine rotation speed change rate setting unit 140a is the same as the rotation speed change rate setting unit 140a according to the second embodiment. Therefore, as in the rotation speed change rate setting unit 140a according to the second embodiment, the steam turbine rotation speed change rate setting unit 140a according to the present embodiment also has the basic rotation speed change rate calculation unit 141a, the change value calculation unit 144a, and the change unit 150a. The steam operation amount output unit 160a is the same as the steam operation amount output unit 160a according to the second embodiment. Therefore, as in the steam operation amount output unit 160a according to the second embodiment, the steam operation amount output unit 160a according to the present embodiment also has the output change rate conversion unit 162, the rotation speed change rate conversion unit 164, and the selection unit 169.

In the combined cycle plant, if the rotation speed RPM or the output PW of the gas turbine 1 increases, the rotation speed RPM or the output PW of the steam turbine 70 increases in response thereto. In addition, as described above, according to the gas turbine 1, in a case where the rotation speed RPM or the output PW increases, the gas turbine clearance amount CLg temporarily decreases. In a case where the rotation speed RPM or the output PW decreases, the gas turbine clearance amount CLg temporarily increases. As described above, according to the steam turbine 70, in a case where the rotation speed RPM or the output PW increases, the steam clearance amount CLs temporarily increases. In a case where the rotation speed RPM or the output PW decreases, the steam clearance amount CLs temporarily decreases.

Therefore, according to the present embodiment, in a case where the rotation speed RPM and the output PW (output PW in the whole combined cycle plant) of the generator 9c increase, based on the gas turbine clearance amount CLg that temporarily decreases, the output change rate ΔPW and the rotation speed change rate ΔRPM of the gas turbine 1 are determined, and the output change rate ΔPW and the rotation speed change rate ΔRPM of the steam turbine 70 are determined. In addition, according to the present embodiment, in a case where the rotation speed RPM and the output PW of the generator decrease, based on the steam turbine clearance amount CLs that temporarily decreases, the output change rate ΔPW and the rotation speed change rate ΔRPM of the gas turbine 1 are determined, and the output change rate ΔPW and the rotation speed change rate ΔRPM of the steam turbine 70 are determined.

Therefore, according to the present embodiment, when the steam turbine clearance amount CLs is large in which the rotation speed RPM or the output PW increases less, out of the gas turbine clearance amount CLg and the steam turbine clearance amount CLs, the rotation speed change rate ΔRPM and the output change rate ΔPW of both the gas turbine 1 and the steam turbine 70 increase. On the other hand, when the gas turbine clearance amount CLg is large in which the rotation speed RPM or the output PW decreases more, out of the gas turbine clearance amount CLg and the steam turbine clearance amount CLs, the rotation speed change rate ΔRPM and the output change rate ΔPW of both the gas turbine 1 and the steam turbine 70 increase. In addition, according to the present embodiment, when the steam turbine clearance amount CLs is small in which the rotation speed RPM or the output PW increases less, out of the gas turbine clearance amount CLg and the steam turbine clearance amount CLs, the rotation speed change rate ΔRPM and the output change rate ΔPW of both the gas turbine 1 and the steam turbine 70 decrease. On the other hand, when the gas turbine clearance amount CLg is small in which the rotation speed RPM or the output PW decreases more, out of the gas turbine clearance amount CLg and the steam turbine clearance amount CLs, the rotation speed change rate ΔRPM and the output change rate ΔPW of both the gas turbine 1 and the steam turbine 70 decrease.

Therefore, according to the present embodiment, as in the first embodiment, the actuation time until the rotation speed RPM reaches the rated rotation speed can be shortened. Furthermore, according to the present embodiment, the time until the output PW reaches the required output can be shortened. Moreover, according to the present embodiment, both the gas turbine clearance amount CLg and the steam turbine clearance amount CLs can be prevented from being extremely smaller.

The combined cycle plant includes a multi-axis type combined cycle plant in addition to the single-axis type combined cycle plant as in the present embodiment. In the multi-axis type combined cycle plant, the gas turbine rotor and the steam turbine rotor 71 are not mechanically connected to each other, and the rotor of the individual generator is connected to each of the gas turbine rotor 2 and the steam turbine rotor 71. In the multi-axis type combined cycle plant, as in the single-axis type combined cycle plant described above, if the rotation speed RPM and the output PW of the gas turbine 1 increase, the rotation speed RPM and the output PW of the steam turbine 70 increase in response thereto. Therefore, the multi-axis type combined cycle plant may also be controlled similarly to the present embodiment.

INDUSTRIAL APPLICABILITY

According to an aspect of the present invention, a rotation speed or an output of a rotating machine can reach a target value in a short time while damage to the rotating machine is prevented.

REFERENCE SIGNS LIST

1: gas turbine (rotating machine)
2: gas turbine rotor
5: gas turbine casing
9, 9a, 9c: generator
9b: motor 10, 80: compressor
11, 81: compressor rotor
12, 82: rotor shaft
13, 83: rotor blade row
14, 85: stator blade row
18, 88: compressor casing
18a: compressor body casing
18b: intermediate casing
19: air compression flow path
21: IGV (inlet guide vane)
22: movable blade
23: driver
30: combustor
31: combustion cylinder (or tail cylinder)
32: fuel injector
35: fuel line
36: fuel control valve (operation terminal)
40: turbine
41: turbine rotor
42: rotor shaft
42a: first step shaft portion
42c: cooling passage
43: rotor blade row
44: rotor blade
44a: first row rotor blade
44c: cooling passage
48: turbine casing
49: combustion gas flow path
53: stator blade row
54: stator blade
60: cooling device
61: air bleeding line
62: cooler
63: medium line
64: cooling controller
70: steam turbine (rotating machine)
71: steam turbine rotor
72: rotor shaft
73: rotor blade row
74: rotor blade
75: stator blade row
76: stator blade
78: steam turbine casing
78i: steam inlet
78o: steam outlet
79: steam main flow path
84: rotor blade
84a: final row rotor blade
86: stator blade
88i: gas inlet
88o: gas outlet
89: gas compression flow path
91, 91c: main steam line
92: steam control valve (operation terminal)
93: compressed gas line
94: power circuit (operation terminal)
95: heat recovery system generator
96: condenser
97: water supply line
98: water supply pump
100, 100a, 100b, 100c: control device
101: clearance measuring instrument
101a: gas turbine clearance measuring instrument
101b: steam turbine clearance measuring instrument
102: rotation speed meter (parameter meter)
103: output meter (parameter meter)
104: flowmeter (parameter meter)
110, 110a, 110b, 110c: control device body
111: clearance signal processing unit
111a: first clearance signal processing unit
111b: second clearance signal processing unit
112: clearance selection output unit
120: output change rate setting unit (gas turbine output change rate setting unit)
120a: output change rate setting unit (steam turbine output change rate setting unit)
120b: flow rate change rate setting unit
121, 121a: basic output change rate calculation unit
122: target output calculation unit
123, 129, 129b, 143, 149: ΔPI calculation unit
124, 124a, 124b, 144, 144a: change value calculation unit
125: upper limit output change rate calculation unit
125b: upper limit flow rate change rate calculation unit
126, 126b, 146: first change value calculation unit (first calculation unit)
127, 127b, 147: second change value calculation unit (second calculation unit)
128, 128b, 148: allowable minimum value storage unit
130, 130a, 150, 150a, 172, 182: change unit
131, 151: first adder
132, 152: second adder
133, 153: minimum value selector
140: rotation speed change rate setting unit (gas turbine rotation speed change rate setting unit)
140a: rotation speed change rate setting unit (steam turbine rotation speed change rate setting unit)
141, 141a: basic rotation speed change rate calculation unit
142: target rotation speed calculation unit
145: upper limit rotation speed change rate calculation unit
160: fuel operation amount output unit
160a: steam operation amount output unit
160b: flow rate operation amount output unit
162, 162a: output change rate conversion unit
164, 164a: rotation speed change rate conversion unit
169, 169a: selection unit
170: cooling operation amount setting unit
171: cooling operation amount generation unit
179: cooling operation amount output unit
180: intake air operation amount setting unit
181: IGV opening degree generation unit
189: intake air operation amount output unit
191: CPU
192: memory
193: auxiliary storage device
193a: gas turbine eigenvalue data
193b: control program
193c: operating system (OS) program
194: storage/reproduction device
195: input and output interface
195a: manual input device
195b: display device
196: equipment input interface
197: equipment output interface
198: communication interface
Ar: axis
Da: axial direction
Dau: axial upstream side
Dad: axial downstream side
Dc: circumferential direction
Dr: radial direction
Dri: radial inner side
Dro: radial outer side

The invention claimed is:

1. A control device of a rotating machine including a rotating rotor and a casing for covering an outer peripheral side of the rotor, the control device comprising:
   an operation terminal that changes a parameter which is a rotation speed or an output of the rotating machine;
   a clearance measuring instrument that measures a clearance amount between the rotor and the casing;
   a parameter change rate setting unit that determines a change rate of the parameter in accordance with the clearance amount so as to change the change rate of the parameter; and
   an operation amount output unit that determines an operation amount of the operation terminal in accordance with the change rate of the parameter, and that outputs the operation amount to the operation terminal,
   wherein the parameter change rate setting unit determines the change rate of the parameter so that the change rate of the parameter in a case of obtaining a second clearance amount larger than a first clearance amount is higher than the change rate of the parameter in a case of obtaining the first clearance amount.

2. Rotating machine equipment comprising:
   the control device of the rotating machine according to claim 1; and
   the rotating machine.

3. A control device of a rotating machine including a rotating rotor and a casing for covering an outer peripheral side of the rotor, the control device comprising:
   an operation terminal that changes a parameter which is a rotation speed or an output of the rotating machine;
   a clearance measuring instrument that measures a clearance amount between the rotor and the casing;
   a parameter change rate setting unit that determines a change rate of the parameter in accordance with the clearance amount so as to change the change rate of the parameter; and
   an operation amount output unit that determines an operation amount of the operation terminal in accordance with the change rate of the parameter, and that outputs the operation amount to the operation terminal,
   wherein the parameter change rate setting unit has
      a basic change rate calculation unit that obtains a basic change rate of the parameter in accordance with a deviation between a target value of the parameter and a detection value of the parameter,
      a change value calculation unit that obtains a change value for changing the basic change rate in accordance with the clearance amount, and
      a change rate change unit that changes the basic change rate by using the change value.

4. The control device of a rotating machine according to claim 3,
   wherein the change value calculation unit has a first calculation unit that uses a relationship between the clearance amount and a first change value for changing the basic change rate so as to obtain the first change value corresponding to the clearance amount, and
   wherein the change rate change unit uses the first change value so as to change the basic change rate.

5. The control device of a rotating machine according to claim 4,
   wherein the change value calculation unit has a second calculation unit that obtains a second change value for changing the basic change rate in accordance with a deviation between the clearance amount and a predetermined allowable minimum clearance amount, and
   wherein the change rate change unit uses the first change value and the second change value so as to change the basic change rate.

6. The control device of a rotating machine according to claim 4,
   wherein the relationship is a relationship in which the first change value increases as the clearance amount increases.

7. A rotating machine equipment comprising:
   a control device of a rotating machine including a rotating rotor and a casing for covering an outer peripheral side of the rotor, the control device comprising:
      an operation terminal that changes a parameter which is a rotation speed or an output of the rotating machine;
      a clearance measuring instrument that measures a clearance amount between the rotor and the casing;
      a parameter change rate setting unit that determines a change rate of the parameter in accordance with the clearance amount so as to change the change rate of the parameter; and
      an operation amount output unit that determines an operation amount of the operation terminal in accordance with the change rate of the parameter, and that outputs the operation amount to the operation terminal; and
   the rotating machine,
   wherein a first rotating machine and a second rotating machine are provided as the rotating machine,
   wherein the first rotating machine is a gas turbine,
   wherein the second rotating machine is a steam turbine,
   wherein the rotating machine equipment comprises a heat recovery system generator that generates steam by using exhaust gas exhausted from the gas turbine, and that feeds the steam to the steam turbine,
   wherein the gas turbine has a compressor that generates compressed air by compressing air, a combustor that generates combustion gas by combusting a fuel in the compressed air, and a turbine driven by using the combustion gas,
   wherein the compressor has a rotating compressor rotor, and a compressor casing that covers the compressor rotor,
   wherein the turbine has a rotating turbine rotor, and a turbine casing that covers the turbine rotor,
   wherein the compressor rotor and the turbine rotor are mechanically connected to each other so as to form a gas turbine rotor,
   wherein the operation terminal of the gas turbine is a fuel control valve that controls a flow rate of the fuel to be supplied to the combustor,
   wherein the clearance measuring instrument of the gas turbine is a gas turbine clearance measuring instrument that measures a gas turbine clearance amount between the turbine rotor and the turbine casing,
   wherein the steam turbine has a rotating steam turbine rotor, and a steam turbine casing that covers the steam turbine rotor,
   wherein the operation terminal of the steam turbine is a steam control valve that controls a flow rate of the steam to be supplied to the steam turbine from the heat recovery system generator,
   wherein the clearance measuring instrument of the steam turbine is a steam turbine clearance measuring instrument that measures a steam turbine clearance amount between the steam turbine rotor and the steam turbine casing, wherein the parameter change rate setting unit of the gas turbine determines the change rate of a gas turbine parameter which is the parameter relating to the gas turbine so that the change rate of the gas turbine parameter is changed in accordance with the gas turbine clearance amount when the gas turbine parameter increases, and determines the change rate of the gas turbine parameter so that the change rate of the gas turbine parameter is changed in accordance with the steam turbine clearance amount when the gas turbine parameter decreases,
wherein the operation amount output unit of the gas turbine determines an operation amount of the fuel control valve in accordance with the change rate of the gas turbine parameter which is determined by the parameter change rate setting unit of the gas turbine, and outputs the operation amount of the fuel control valve to the fuel control valve,
wherein the parameter change rate setting unit of the steam turbine determines a change rate of a steam turbine parameter which is the parameter relating to the steam turbine so that the change rate of the steam turbine parameter is changed in accordance with the gas turbine clearance amount when the steam turbine parameter increases, and determines the change rate of the steam turbine parameter so that the change rate of the steam turbine parameter is changed in accordance with the steam turbine clearance amount when the steam turbine parameter decreases, and
wherein the operation amount output unit of the steam turbine determines an operation amount of the steam control valve in accordance with the change rate of the steam turbine parameter which is determined by the parameter change rate setting unit of the steam turbine, and outputs the operation amount of the steam control valve to the steam control valve.

8. A control method of a rotating machine including a rotating rotor and a casing for covering an outer peripheral side of the rotor, the control method comprising:
a step of receiving a clearance amount between the rotor and the casing;
a step of determining a change rate of a parameter which is a rotation speed or an output of the rotating machine so that the change rate of the parameter is changed in accordance with the clearance amount; and
a step of determining an operation amount of an operation terminal for changing the parameter in accordance with the change rate of the parameter, and outputting the operation amount to the operation terminal,
wherein in the step of determining the change rate of the parameter, the change rate of the parameter is determined so that the change rate of the parameter in a case of obtaining a second clearance amount larger than a first clearance amount is higher than the change rate of the parameter in a case of obtaining the first clearance amount.

9. A control method of a rotating machine including a rotating rotor and a casing for covering an outer peripheral side of the rotor, the control method comprising:
a step of receiving a clearance amount between the rotor and the casing;
a step of determining a change rate of a parameter which is a rotation speed or an output of the rotating machine so that the change rate of the parameter is changed in accordance with the clearance amount; and
a step of determining an operation amount of an operation terminal for changing the parameter in accordance with the change rate of the parameter, and outputting the operation amount to the operation terminal,
wherein the step of determining the change rate of the parameter includes
a step of obtaining a basic change rate of the parameter in accordance with a deviation between a target value of the parameter and a detection value of the parameter,
a step of obtaining a change value for changing the basic change rate, and
a step of changing the basic change rate by using the change value.

10. The control method of a rotating machine according to claim 9,
wherein the step of obtaining the change value includes a step of using a relationship between the clearance amount and a first change value for changing the basic change rate so as to obtain the first change value corresponding to the clearance amount, and
wherein in the step of changing the basic change rate, the first change value is used to change the basic change rate.

11. The control method of a rotating machine according to claim 10,
wherein the step of obtaining the change value includes a step of obtaining a second change value for changing the basic change rate in accordance with a deviation between the clearance amount and a predetermined allowable minimum clearance amount, and
wherein in the step of changing the basic change rate, the first change value and the second change value are used to change the basic change rate.

12. The control method of a rotating machine according to claim 10,
wherein the relationship is a relationship in which the first change value increases as the clearance amount increases.

13. A non-transitory computer-readable storage medium storing a control program of a rotating machine including a rotating rotor and a casing for covering an outer peripheral side of the rotor, the control program causing a computer to execute
a step of causing an input device of the computer to receive a clearance amount between the rotor and the casing;
a step of determining a change rate of a parameter which is a rotation speed or an output of the rotating machine so that the change rate of the parameter is changed in accordance with the clearance amount; and
a step of determining an operation amount of an operation terminal for changing the parameter in accordance with the change rate of the parameter, and outputting the operation amount to the operation terminal,
wherein in the step of determining the change rate of the parameter, the change rate of the parameter is determined so that the change rate of the parameter in a case of obtaining a second clearance amount larger than a first clearance amount is higher than the change rate of the parameter in a case of obtaining the first clearance amount.

14. A non-transitory computer-readable storage medium storing a control program of a rotating machine including a rotating rotor and a casing for covering an outer peripheral side of the rotor, the control program causing a computer to execute a step of causing an input device of the computer to receive a clearance amount between the rotor and the casing;

a step of determining a change rate of a parameter which is a rotation speed or an output of the rotating machine so that the change rate of the parameter is changed in accordance with the clearance amount; and a step of determining an operation amount of an operation terminal for changing the parameter in accordance with the change rate of the parameter, and outputting the operation amount to the operation terminal, wherein the step of determining the change rate of the parameter includes a step of obtaining a basic change rate of the parameter in accordance with a deviation between a target value of the parameter and a detection value of the parameter, a step of obtaining a change value for changing the basic change rate, and a step of obtaining a change amount for changing the basic change rate by using the change value.

15. The non-transitory computer-readable storage medium storing the control program of a rotating machine according to claim 14, wherein the step of obtaining the change value includes a step of using a relationship between the clearance amount and a first change value for changing the basic change rate so as to obtain the first change value corresponding to the clearance amount, and wherein in the step of changing the basic change rate, the first change value is used to change the basic change rate.

16. The non-transitory computer-readable storage medium storing the control program of a rotating machine according to claim 15, wherein the step of obtaining the change value includes a step of obtaining a second change value for changing the basic change rate in accordance with a deviation between the clearance amount and a predetermined allowable minimum clearance amount, and wherein in the step of changing the basic change rate, the first change value and the second change value are used to change the basic change rate.

17. The non-transitory computer-readable storage medium storing the control program of a rotating machine according to claim 15, wherein the relationship is a relationship in which the first change value increases as the clearance amount increases.

\* \* \* \* \*